United States Patent
Sekine

(10) Patent No.: US 9,924,076 B2
(45) Date of Patent: Mar. 20, 2018

(54) MOTION DETECTION SOLID-STATE IMAGE CAPTURING DEVICE AND MOTION DETECTION SYSTEM

(71) Applicant: SETECH CO., LTD., Kanagawa (JP)

(72) Inventor: Hirokazu Sekine, Kanagawa (JP)

(73) Assignee: SETECH CO., LTD., Kanagawa (JP)

( * ) Notice: Subject to any disclaimer, the term of this patent is extended or adjusted under 35 U.S.C. 154(b) by 313 days.

(21) Appl. No.: 14/438,427

(22) PCT Filed: Oct. 10, 2013

(86) PCT No.: PCT/JP2013/077681
§ 371 (c)(1),
(2) Date: Jul. 14, 2015

(87) PCT Pub. No.: WO2014/069212
PCT Pub. Date: May 8, 2014

(65) Prior Publication Data
US 2015/0319341 A1    Nov. 5, 2015

(30) Foreign Application Priority Data

Oct. 29, 2012  (JP) ................................ 2012-249692

(51) Int. Cl.
*H04N 5/14* (2006.01)
*H04N 5/353* (2011.01)
(Continued)

(52) U.S. Cl.
CPC ........... *H04N 5/144* (2013.01); *G06T 3/4015* (2013.01); *G06T 7/20* (2013.01); *H04N 5/23254* (2013.01);
(Continued)

(58) Field of Classification Search
CPC .... H04N 5/144; H04N 5/23254; H04N 5/353; H04N 5/341; H04N 5/3535; H04N 5/357; H04N 5/374; G06T 3/4015; G06T 7/20
See application file for complete search history.

(56) References Cited

U.S. PATENT DOCUMENTS 5,990,471 A     11/1999 Watanabe
2003/0035059 A1  2/2003 Suzuki
(Continued)

FOREIGN PATENT DOCUMENTS

JP    08-331504 A    12/1996
JP    10-290400 A    10/1998
(Continued)

OTHER PUBLICATIONS

European Search Report dated Oct. 26, 2015, in connection with European Application No. 13851757 (8 pgs.).
(Continued)

*Primary Examiner* — Mishawn Hunter
(74) *Attorney, Agent, or Firm* — Maier & Maier, PLLC

(57) ABSTRACT

An object is to provide a motion detection solid-state image-capturing device and a motion detection system having a reduced power consumption and an improved motion detection accuracy. One solution is to combine together signals of a longer exposure time for a plurality of pixels and signals of a shorter exposure time for a plurality of pixels, which signals are output from a motion detection image-capturing device, and to determine the presence/absence of a moving object based on a differential signal between the signals of a longer exposure time and the signals of a shorter exposure time, wherein if it is determined that there is no moving object, at least part of a circuit of a motion detection
(Continued)

image processing device or a video management device is stopped, thereby improving the detection accuracy and conserving the electric power.

15 Claims, 14 Drawing Sheets

(51) Int. Cl.
    *H04N 5/357*      (2011.01)
    *H04N 9/07*      (2006.01)
    *G06T 7/20*      (2017.01)
    *G06T 3/40*      (2006.01)
    *H04N 5/374*      (2011.01)
    *H04N 9/04*      (2006.01)
    *H04N 5/341*      (2011.01)
    *H04N 5/232*      (2006.01)
    *H04N 5/355*      (2011.01)
    *H04N 5/3745*      (2011.01)
    *H04N 101/00*      (2006.01)

(52) U.S. Cl.
    CPC .............. *H04N 5/341* (2013.01); *H04N 5/353* (2013.01); *H04N 5/357* (2013.01); *H04N 5/3535* (2013.01); *H04N 5/35554* (2013.01); *H04N 5/374* (2013.01); *H04N 5/37457* (2013.01); *H04N 9/045* (2013.01); *H04N 9/07* (2013.01); *G06T 2200/32* (2013.01); *G06T 2207/10016* (2013.01); *G06T 2207/10024* (2013.01); *G06T 2207/10144* (2013.01); *G06T 2207/20182* (2013.01); *G06T 2210/61* (2013.01); *H04N 2101/00* (2013.01); *H04N 2209/045* (2013.01)

(56) References Cited

U.S. PATENT DOCUMENTS

| | | |
|---|---|---|
| 2011/0075000 A1 | 3/2011 | Border |
| 2011/0317028 A1 | 12/2011 | Shinmei |
| 2012/0229669 A1 | 9/2012 | Okada |

FOREIGN PATENT DOCUMENTS

| | | | |
|---|---|---|---|
| JP | 2001-245213 | A | 9/2001 |
| JP | 2002-112192 | A | 4/2002 |
| JP | 2004-159274 | A | 6/2004 |
| JP | 2005-151150 | A | 6/2005 |
| JP | 2007-259383 | A | 10/2007 |
| JP | 2009-239366 | A | 10/2009 |
| JP | 2010-041434 | A | 2/2010 |
| JP | 2010-071659 | A | 4/2010 |
| JP | 2010-074584 | A | 4/2010 |
| JP | 2010-130664 | A | 6/2010 |
| JP | 2010-232908 | A | 10/2010 |
| JP | 2011-030181 | A | 2/2011 |
| JP | 2011-166535 | A | 8/2011 |
| JP | 2011-229030 | A | 11/2011 |
| JP | 2011-244309 | A | 12/2011 |
| JP | 2012-010105 | A | 1/2012 |
| WO | 2012/081154 | A1 | 6/2012 |
| WO | 2012/117616 | A1 | 9/2012 |

OTHER PUBLICATIONS

International Search Report (ISR) dated Jan. 21, 2014, in connection with International Application No. PCT/JP2013/077681 (9 pgs.).
JP Office Action dated Jul. 5, 2013, in connection with JP Application No. 2012-249692 (14 pgs.).
JP Office Action dated Oct. 10, 2013, in connection with JP Application No. 2012-249692 (16 pgs.).
JP Office Action dated Jan. 29, 2014, in connection with JP Application No. 2012-249692 (17 pgs.).
JP Office Action dated Dec. 25, 2014, in connection with JP Application No. 2014-171039 (16 pgs.).

MOTION DETECTION SOLID-STATE IMAGE CAPTURING DEVICE AND MOTION DETECTION SYSTEM

TECHNICAL FIELD

The present invention relates to a motion detection solid-state image-capturing device and a motion detection system for detecting a motion of a video image on a captured image screen.

BACKGROUND ART

In the market of solid-state image-capturing devices, there has recently been a rapid increase in the sales of those of the CMOS sensor-type for use in mobile telephones. Each pixel section of a CMOS sensor-type solid-state image-capturing device includes a photoelectric conversion unit (hereinafter referred to as a pixel) for generating a signal charge according to the incident light, and an amplification unit for converting the signal charge of the photoelectric conversion unit into a signal voltage and amplifying the signal voltage.

Solid-state image-capturing devices not only simply capture video images, but may also detect a motion of an object on a captured image screen of the solid-state image-capturing device. For example, they are used in motion detection systems for continuously capturing an image of the same field of view and detecting a person entering this field of view so as to control various devices in response to the entrance of the person or to inform or record the entrance of the person.

As a method for detecting such a motion of a video image on an captured image screen, there is Method 1 in which a motion is detected based on comparison between signal outputs of the same pixel from two consecutive frames (Patent Document No. 1). There is also Method 2 in which the integration time is varied while treating adjacent pixels as a pair so as to adjust the gain and detect a motion based on the differential signal (Patent Document No. 2).

The former Method 1 requires a frame memory, thereby resulting in a large circuit scale and increasing the power consumption. Moreover, a cost increase cannot be avoided. With the latter Method 2, a differential signal is generated at an edge portion of an object, thereby generating an erroneous detection signal, and resulting in a poor motion detection accuracy.

Particularly, when capturing a color video image, where one employs the Bayer arrangement, a typical color filter arrangement (2×2-pixel sets, in which G (green) color filters are arranged diagonally, with an R (red) and a B (blue) color finger arranged in the remaining positions), pixel signals of the same G color, which occur at least at every other pixels, will be used, thereby increasing the erroneous detection signal, thus further deteriorating the motion detection accuracy.

Moreover, the motion detection operation detects whether there is an object that is moving constantly. Therefore, there is a demand for a solid-state image-capturing device or a motion detection system having a small power consumption.

CITATION LIST

Patent Literature

Patent Document No. 1: Japanese Laid-Open Patent Publication No. 2011-166535

Patent Document No. 2: Japanese Laid-Open Patent Publication No. H10-290400

SUMMARY OF INVENTION

Technical Problem

It is an object of the present invention to provide a motion detection solid-state image-capturing device and a motion detection system with an improved motion detection accuracy.

Solution to Problem

In order to solve the problems set forth above, a motion detection image-capturing device of the present invention includes: a pixel section having photoelectric conversion elements; a timing generation circuit for driving the pixel section; a plurality of accumulation time generation circuits for controlling the accumulation time of the photoelectric conversion elements; a vertical scanning circuit for scanning lines of the pixel section in a vertical direction; a vertical parallel control circuit for simultaneously driving a plurality of vertical lines of the pixel section; and a horizontal combination circuit for horizontally combining analog signals output from vertical signal lines of the pixel section, wherein an accumulation time control for the photoelectric conversion elements for detecting a moving object during a moving object detecting operation is performed so that the pixel section is divided into at least two sections in a lattice pattern, one section for long-period accumulation and another section for short-period accumulation, and wherein output signals of the plurality of photoelectric conversion elements having the same length of accumulation time are combined together and output by using the vertical parallel control circuit or the horizontal combination circuit.

A motion detection system includes a captured image signal separation circuit for dividing output signals of one screen captured by a motion detection image-capturing device into captured image signals having different lengths of accumulation time; a differential signal generation circuit for generating a differential signal between the divided captured image signals; a motion determination circuit for determining whether an object has moved in the captured screen based on the differential signal generated by the differential signal generation means; and a signal process stopping circuit for stopping at least part of a circuit of a motion detection image processing device or a video signal management device based on a motion determination signal obtained by the determination by the motion determination means.

Advantageous Effects of Invention

According to the present invention, it is possible to significantly reduce the power consumption of a solid-state image-capturing device and a motion detection system during motion detection. Moreover, since the random noise can be reduced, the motion detection sensitivity under low illumination is improved. Moreover, it is possible to perform a motion detection with a high accuracy by suppressing the false signal (noise) occurring at the edge.

DESCRIPTION OF EMBODIMENTS

Figure 1:
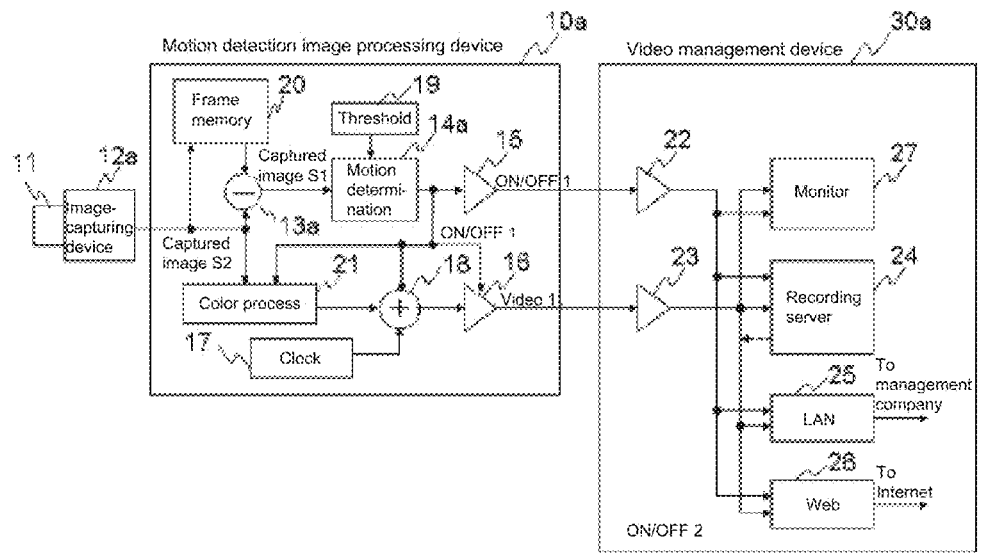
FIG. 1 A block diagram showing a schematic configuration of a motion detection system according to a first embodiment of the present invention.

Motion detection solid-state image-capturing devices and motion detection systems according to embodiments of the present invention will now be described with reference to the drawings. In the following description, like members will be denoted by like reference numerals and process names, and will be described in detail for the first appearance thereof, while omitting redundant description of such like members.

<Embodiment 1 of Motion Detection System>

A motion detection system according to Embodiment 1 of the motion detection system of the present invention will be described in detail with reference to a block diagram of FIG. 1 showing a schematic configuration thereof.

The present motion detection system of Embodiment 1 includes a motion detection camera and a video management device 30a, wherein the motion detection camera is composed of an image-capturing device 12a including an image-capturing lens 11, and a motion detection image processing device 10a.

The motion detection image processing device 10a includes: a frame memory 20 for storing a captured image signal for one screen captured; a differential signal generation circuit 13a for generating a differential signal between a captured image (pixel) signal S1 and a captured image (pixel) signal S2 captured at different image-capturing times; a motion determination circuit 14a for determining the presence/absence of a moving object in the captured screen based on the differential signal; a motion determination threshold setting circuit 19 for setting a determination level for determining a motion; a color signal processing circuit 21 for processing the captured image signal S2 of the image-capturing device 12a to be a video signal to be reproduced on a monitor; a time generation circuit (clock 17) for recording the image-capturing date and the image-capturing time on the color-processed video signal; a time addition circuit 18 for embedding date and time signals in the video signal; a video signal output circuit 16 for outputting the video signal 1 with the time embedded therein; and a motion determination signal output circuit 15 for outputting the determination result obtained by motion determination, for example.

The video management device 30a includes: a motion determination signal input circuit 22; a video signal input circuit 23; a recording server 24 for recording the received video signal 1; a video monitor 27 for reproducing the video signal 1; a LAN output device 25 for transmitting the video signal to a management company; and a Web output device 26 for allowing a mobile telephone, a personal computer or the like to receive the video signal via the Internet, for example.

The differential signal generation circuit 13a generates the differential signal between the captured image signal S1 and the captured image signal S2. Output as the generated differential signal is a differential signal of an absolute value irrespective of the positive/negative polarity. Where there is no moving object in the captured screen, a noise-level differential signal is output. Where there is a moving object, a large differential signal is generated.

The motion determination threshold setting circuit 19 sets Level Threshold 1 for counting so that a noise-level differential signal is not counted, and also sets a count value to be Threshold 2. Based on the thresholds, it is determined that there is a moving object when the count value becomes high.

The motion determination circuit 14a counts the number of times that the level of the output signal of the differential signal generation circuit 13a is greater than Threshold 1. Then, when the count value becomes higher than Threshold 2, it is determined that there is a moving object, thereby turning the determination signal ON/OFF1 to the HI level. It is set to the LO level when there is no motion.

Although an absolute value is used for the differential signal, it may be a signal only on the positive side or on the negative side.

Where it is determined that there is no motion by using the motion determination signal (ON/OFF1) generated by the motion determination circuit 14a, it is possible to reduce the power consumption of the motion detection image processing device 10a by stopping the circuit operation and the signal processing operation of the color signal processing circuit 21, the time addition circuit 18, the video signal output circuit 16, etc. Similarly, it is possible to significantly reduce the power consumption of the motion detection system as a whole by stopping the operation of the recording server 24, the LAN output device 25, the Web output device 26 and the monitor 27, etc., of the video management device 30a in a subsequent stage. Moreover, since the recording server 24 does not record a video signal involving no motion, it is possible to reduce the capacity of the recording server, thereby reducing the size and the price thereof, or it is possible to record/store a video signal involving a motion over a longer period of time.

As Stop Method 1 for stopping the process operation of circuits and devices based on the motion determination signal, the input signal of the color signal process (captured image S2) is shut off. For example, the digital values of the 10 bits of the input signal are all switched to zero. Signals subsequent to the color signal processing circuit become zero, thereby stopping the switching operation (switching between 0 and 1) of digital circuits, and it is therefore possible to reduce the power consumption of circuit operations.

As Stop Method 2, circuits and devices are provided with a reset switch for returning to the original state when an erroneous operation occurs. By keeping the reset switch ON, it is possible to keep the circuit processes of the circuits and devices stopped, thereby reducing the power consumption.

As Stop Method 3, the power supply to circuits and devices which one wishes to stop is shut off by a regulator IC having a shutoff function. It is also possible to provide a relay circuit in the power supply, and it is possible to shut off the relay circuit, thereby significantly reducing the power consumption.

<Embodiment 2 of Motion Detection System>

Figure 2:
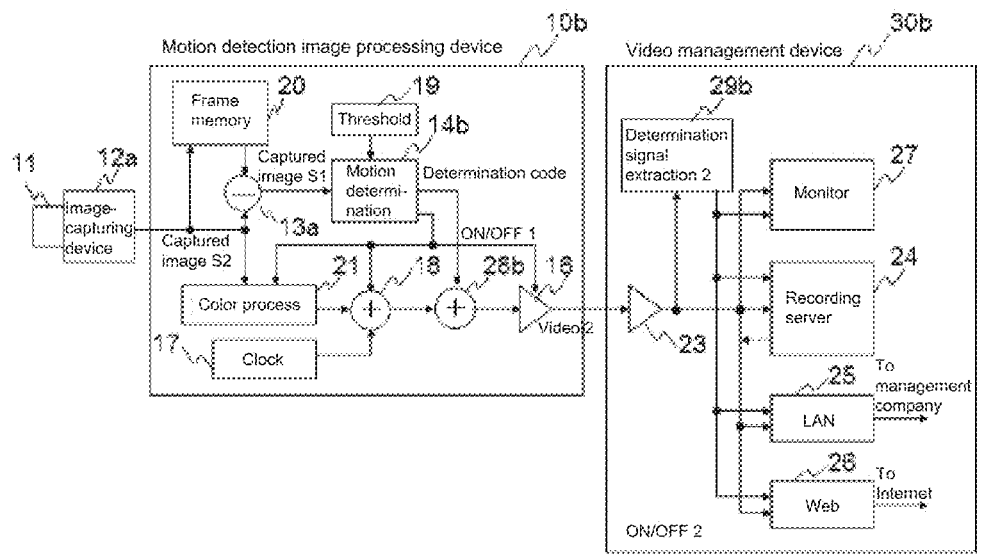
FIG. 2 A block diagram showing a schematic configuration of a motion detection system according to a second embodiment of the present invention.

FIG. 2 is a block diagram showing a schematic configuration of a motion detection system according to Embodiment 2 of the motion detection system of the present invention. The present motion detection system of Embodiment 2 includes a motion detection camera and a video management device 30b, wherein the motion detection camera is composed of an image-capturing device 12a including an image-capturing lens 11, and a motion detection image processing device 10b. Configurations and operations that are different from those of Embodiment 1 will be described.

With the motion detection image processing device 10b, the motion determination signal output circuit 15 of FIG. 1 is eliminated so that the only output signal is video signal 2, thereby providing advantages such as allowing for use of a conventional transmission cable. A motion determination circuit 14b outputs a motion determination signal (ON/OFF1), and also outputs a determination code. As in Embodiment 1, the motion determination signal (ON/OFF1) is used to stop the circuit operation and the signal processing operation of the color signal processing circuit 21, the time addition circuit 18, the video signal output circuit 16, etc.

A determination code obtained by encoding the ON/OFF signal of the determination signal is embedded in the video signal by using a motion determination signal addition circuit 28. Typically, image-capturing information, which is different from the video signal, is embedded during the blanking period where no valid video signal is contained. Similarly, the motion determination signal is encoded, and embedded during the blanking period, thus outputting the video signal 2.

The video management device 30b generates the motion determination signal ON/OFF2 based on the information of the motion determination code by using a determination signal extraction circuit 29b from video signal 2 with the motion determination code embedded therein.

As in Embodiment 1, the processes of the recording server 24, the LAN output device 25, the Web output device 26, the monitor 27, etc., are stopped, thereby significantly reducing the power consumption of the motion detection system. Moreover, since the recording server 24 does not record a video signal involving no motion, it is possible to reduce the capacity of the recording server, thereby reducing the size and the price thereof, or it is possible to record/store a video image involving a motion over a longer period of time.

<Embodiment 3 of Motion Detection System>

Figure 3:
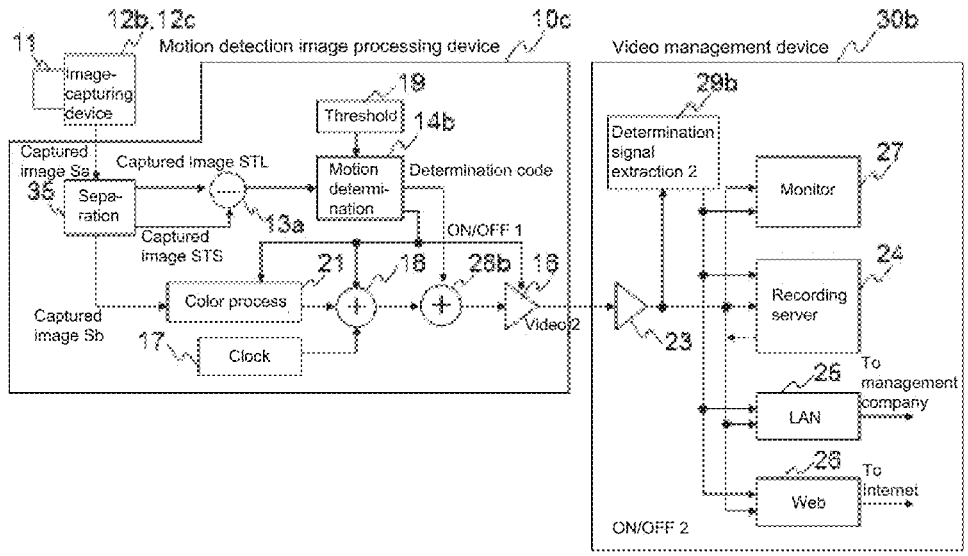
FIG. 3 A block diagram showing a schematic configuration of a motion detection system according to a third embodiment of the present invention.
Figure 4:
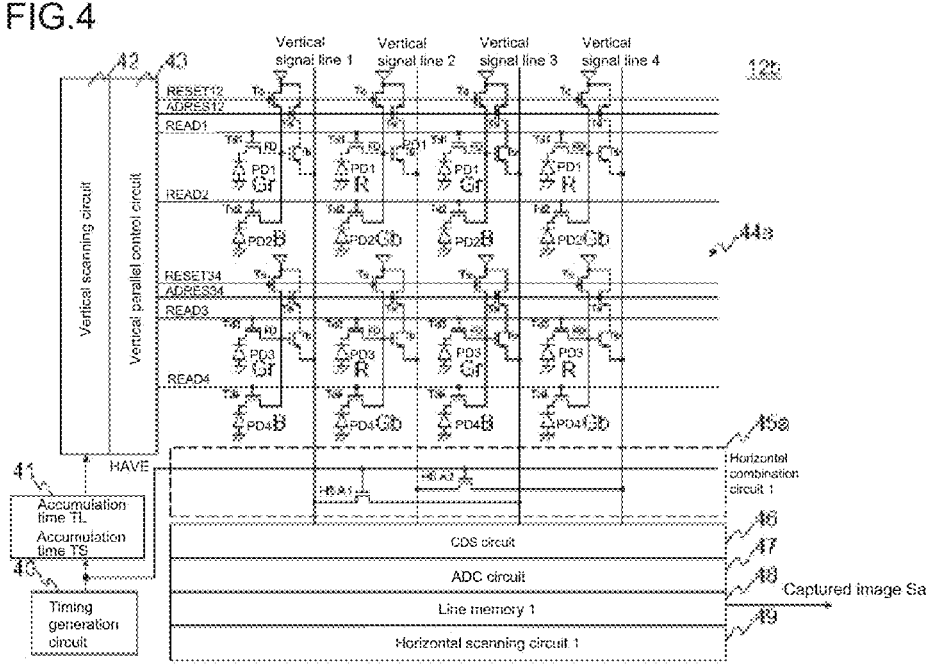
FIG. 4 A block diagram showing a schematic configuration of Example 1 of the motion detection solid-state image-capturing device of FIG. 3.

FIG. 3 is a block diagram showing a schematic configuration of a motion detection system according to Embodiment 3 of the present invention.

The present motion detection system of Embodiment 3 includes a motion detection camera and a video management device 30b, wherein the motion detection camera is composed of an image-capturing device 12b (12c) including an image-capturing lens 11, and a motion detection image processing device 10c. Configurations and operations that are different from those of Embodiment 2 will be described.

The motion detection image processing device 10c receives a captured image (pixel) signal for one screen captured by the image-capturing device 12b (12c), wherein the received signal is a captured image (pixel) signal Sa including a captured image (pixel) signal STL of which the accumulation time (over which the pixel area where photodiodes are arranged two-dimensionally is exposed) is long and a captured image (pixel) signal STS of which the accumulation time (over which the pixel area where photodiodes are arranged two-dimensionally is exposed) is short so as to vary the image-capturing time. Photodiodes of a long accumulation time and photodiodes of a short accumulation time are arranged in a lattice pattern with each other. The captured image signal Sa input to the motion detection image processing device 10c is divided by a captured image signal separation circuit 35 into the captured image signal STL and the captured image signal STS, simultaneously outputting the captured image signal STL and the captured image signal STS, for the pixel to be compared, thereby determining the presence/absence of a moving object in the captured screen based on the differential signal of the differential signal generation circuit 13a.

By reducing the frame memory 20 of Embodiment 2, Embodiment 3 achieves a small size, a lower price and a lower power consumption of the motion detection image processing device 10c. Moreover, the power consumption of the motion detection system is further reduced by outputting a full-resolution captured image signal Sa during the video signal recording operation, while outputting the captured image signal Sa of a reduced sampling number during the motion detection operation.

<Example 1 of Motion Detection Solid-State Image-Capturing Device>

The detailed configuration and the operation of a solid-state image-capturing device 12b (12c) will be described with reference to FIGS. 4 to 10. First, a configuration example of the solid-state image-capturing device 12b according to Embodiment 3 of the motion detection system will be described with reference to FIG. 4. In the solid-state image-capturing device 12b according to Example 1, light is incident on a pixel section 44a through the lens 11, and a signal charge according to the amount of incident light is generated through photoelectric conversion. This pixel section 44a includes a plurality of cells (unit pixels) arranged in a two-dimensional matrix pattern with rows and columns on the semiconductor substrate.

One cell includes four transistors (Ta, Tb, Tc and Td) and two photodiodes (PDn and PDm). Pulse signals ADRESn, RESETn and READn are supplied from vertical drive circuits (a vertical scanning circuit 42 and a vertical parallel control circuit 43) to each cell. Although not shown in the figures, on the upper side of this pixel section 11, load transistors for the source follower circuit are arranged on the vertical signal lines along the horizontal direction. The color filters formed on surfaces of photodiodes where light is incident are arranged two-dimensionally in a typical Bayer arrangement (2×2 pixel arrangement with Gr: green, R: red, B: blue and Gb: green).

Provided are: a timing generation circuit 40 for controlling the pixel section 44a; an accumulation time generation circuit 41 for generating the long accumulation time TL and the short accumulation time TS for controlling the accumulation time of the photodiode for converting a light signal to an electric charge in the pixel section; the vertical scanning circuit 42 for scanning the pixel section in the vertical direction; and the vertical parallel control circuit 43 for simultaneously driving a plurality of vertical lines.

Then, the read circuit for reading vertical signal lines output from the pixel section 44a includes: a horizontal combination circuit 1 (45a) for reducing the horizontal sampling number; a column-type noise cancellation circuit (CDS) 46; a column-type analog-to-digital converter (AD conversion) circuit 47 for converting an analog signal to a digital signal; a line memory 1 (48) for storing the AD-converted digital signal; and a horizontal scanning circuit 1 (49) for reading out the digital signal to the horizontal direction. Where the CDS process is to be included in the operation of the AD conversion circuit 47, the CDS circuit 46 is omitted.

Vertical signal lines n are connected to the CDS circuit 46 via the horizontal combination circuit 1 (45a). In the horizontal combination circuit 1 (45a), two vertical signal lines are connected alternately by switch transistors H5A1 and H5A2. The gate of this transistor is controlled by the HAVE signal of the timing generation circuit 40. By turning ON this HAVE signal, signals output to two vertical signal lines can be horizontally combined (averaged). Moreover, in the vertical parallel control circuit 43, by simultaneously turning ON a plurality of vertical read lines, pixel signals arranged vertically can be vertically combined (averaged).

Figure 5:
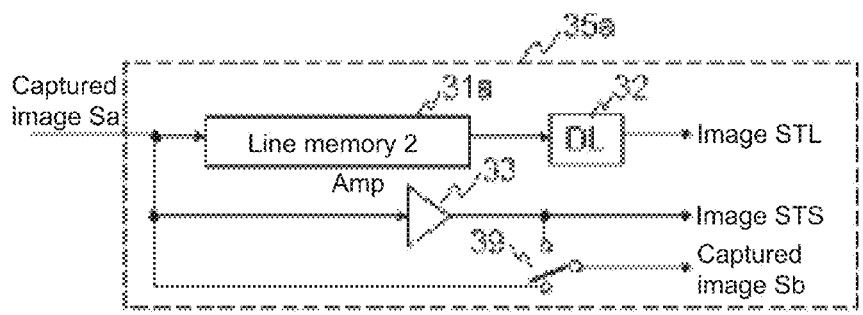
FIG. 5 A configuration diagram showing a captured image signal separation circuit of Example 1 of FIG. 3.

FIG. 5 shows a captured image signal separation circuit 35a of Configuration Example 1. The captured image signal separation circuit 35a includes: a line memory 2 (31a) for delaying the captured image signal Sa by one horizontal (1H) period; a delay circuit DL (32) for delaying the captured image signal Sa by the unit of pixels; an amplifier circuit 33 for amplifying the captured image signal Sa; and a signal switching circuit 39.

In the motion detection operation, a predetermined photodiode of the pixel section 44a of the image-capturing device 12b is operated by an accumulation time TL (long-period accumulation) and by an accumulation time TS (short-period accumulation) so as to read out, line-by-line, from the pixel section 44a. Adjustment is made by the line memory 2 (31a) and the delay circuit DL (32) for each pixel so that the phase is the same between pixel signals to be compared with each other, i.e., the long-accumulated signal STL and the short-accumulated signal STS. Moreover, the short-accumulated image signal STS is amplified through the amplifier circuit 33 with a gain of the accumulation time ratio (TL/TS) so that the signal levels will be generally equal to each other.

Immediately after detecting a moving object, the captured image signal Sa is output while not performing a signal combination (signal read) operation from the pixel section 44a such that the full resolution is achieved. In the full-resolution operation 1, for the captured image signal Sa of a short accumulation time, the signal switching circuit 39 is switched to the side of the signal amplified through the amplifier circuit 33 with a gain of the accumulation time ratio (TL/TS), thereby outputting the captured image signal Sb. For the captured image signal Sa of a long accumulation time, the signal switching circuit 39 is switched to the side of the captured image signal Sa, thereby outputting the captured image signal Sb. In the full-resolution operation 2, photodiodes of all pixels are allowed to accumulate over a long period, and the captured image signal Sa is output, as it is, as the captured image signal Sb. With these operations, after performing a full-resolution image-capturing operation for a predetermined amount of time (e.g. 5 seconds) which is set in advance, the operation mode can be switched to the motion detection operation so that the motion detection can be performed with a reduced power consumption by reducing the sampling number by the signal combination operation.

<Signal Read Operation Example for Video Signal>

Figure 6:
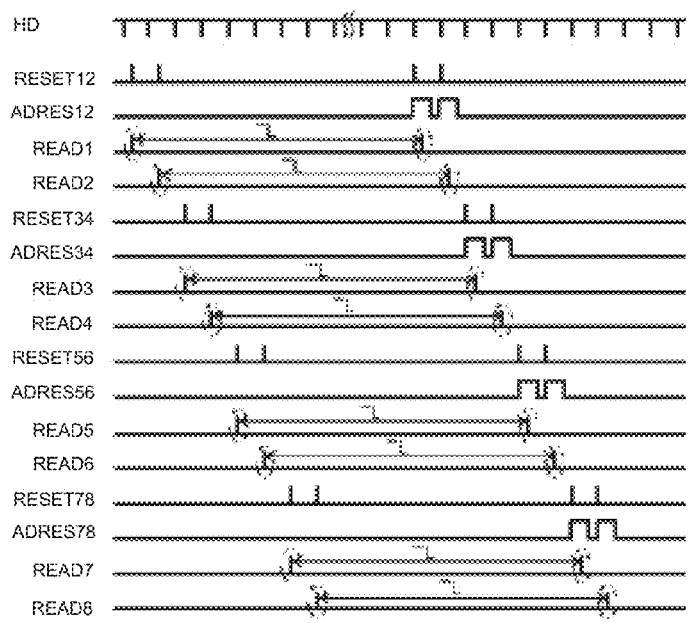
FIG. 6 A timing diagram illustrating an example of a video signal read operation by a pixel section of FIG. 4.

Using the operation timing shown in FIG. 6, a standard captured image signal read operation of the solid-state image-capturing device according to the present example will be described. The accumulation time over which the electric charge obtained by photoelectric conversion through the photodiode PD is accumulated is set to an accumulation time TL, which is common to all pixels. This accumulation time TL is adjusted according to the brightness of the object. The accumulation time TL is controlled for every 1 H by the accumulation time generation circuit 41.

By generating pulses READ1 and RESET12 in synchronism with the horizontal sync signal HD generated by the timing generation circuit 40, accumulation is started after discharging the signal charge which has been accumulated in the photodiode PD1 until the accumulation start time. This operation is performed successively for PD2, PD3, . . .

Then, when a predetermined accumulation time TL is completed, pulse RESET12 is applied immediately before the read pulse READ1, thereby discharging the excessive leak signal which has been generated in the detection section. Then, the read pulse READ1 is applied to read the signal charge which has accumulated in the photodiode PD1.

In the read operation period for RESET12 and READ1, a voltage signal is output to the vertical signal line via the output amplifier by turning ON the ADREA12 pulse. This operation is continued successively for the photodiodes PD2, PD3, . . . , in synchronism with HD, thereby outputting a two-dimensional image. The amplitude of each pulse is set so that the high level is 2.8 V to 3.8 V.

<Example 1 of Motion Detection Signal Read Operation>

Figure 7A:
FIG. 7(A) A configuration diagram schematically showing Examples 1 and 2 of the pixel combining read operation by a pixel section of FIG. 4.

Motion detection signal read operation 1 will be described by using the pixel arrangement of FIG. 7(A) and the operation timing of FIG. 8(A). Motion detection signal read operation 1 reads out a signal obtained by combining (adding or averaging) signals of four Gr pixels indicated by solid-line circles, and a signal obtained by combining (adding or averaging) signals of four Gb pixels indicated by dotted-line circles so as to generate a differential signal between these signals in a subsequent stage and perform a motion determination process.

In the signal combination (addition or averaging) operation in the horizontal direction at the horizontal combination circuit 1 (45a), an averaged signal is generated by turning ON the HAVE signal. By turning ON the switch H5A1, output signals from horizontally-arranged Gr vertical signal lines are averaged. By turning ON the switch H5A2, output signals from horizontally-arranged Gb vertical signal lines are averaged. Switches for averaging are arranged similarly in the horizontal direction.

In this motion detection operation, since the sampling number in the horizontal direction is reduced to ½, the power consumption is reduced by turning OFF the circuit processes for ½ the horizontal pixel count, for the CDS circuit 46 and subsequent components.

The operation of combining (adding or averaging) signals of two vertical pixels will be described by using the operation timing shown in FIG. 8(A). In the signal combination (addition or averaging) in the vertical direction, signals of two pixels in the vertical direction are simultaneously output to a vertical signal line by simultaneously turning ON ADRES12 and ADRES34 as shown in FIG. 8(A). The two output signals are combined (averaged) along the vertical signal line. This is performed simultaneously with the signal combination (averaging) process in the horizontal direction, thereby combining (averaging) signals of four pixels.

First, pulses READ1 and READ3 and RESET12 and RESET34 of odd-numbered lines are simultaneously generated in synchronism with the horizontal sync signal HD of the timing generation circuit 40, thereby discharging the signal charge which has accumulated in the photodiodes PD1 and PD3 up to this point in time, and starting the accumulation operation. Then, in synchronism with the passage of the next two HDs, signals are discharged successively from odd-numbered lines for the photodiodes PD5, PD7, . . . The accumulation time is set to the long-period accumulation TL.

Settings are done by the accumulation time generation circuit 41 so that the next short-period accumulation TS is ½ the long-period accumulation TL. Pulses READ2 and READ4 and RESET12 and RESET34 of even-numbered lines are simultaneously generated in synchronism with a time HD that is ½ the accumulation time TL, thereby discharging the signal charge which has accumulated in the photodiodes PD2 and PD4 up to this point in time, and starting the accumulation operation. Then, in synchronism with the passage of the next two HDs, signals are discharged successively from even-numbered lines for the photodiodes PD6, PD8, . . .

Then, in synchronism with the read time HD, the operation of reading out the accumulated signal charge simultaneously applies pulses RESET12 and RSET34 so as to discharge the excessive leak signal accumulated in the detection unit immediately before the pulse application of the read pulses READ1 and READ3. Then, by applying the read pulses READ1 and READ3, the signal charge which has accumulated in the photodiode is read out to the detection unit, where it is converted to a voltage, which is output from the output amplifier to the vertical signal line.

During the period from the RESET operation to the signal read operation, by simultaneously turning ON pulses ADREA12 and ADRES34, the signals of PD1 and PD3 are simultaneously output as voltage signals to a vertical signal line. By simultaneously turning ON ADRES12 and ADRES34, a signal voltage obtained by averaging signals of two pixels is generated on the vertical signal line. This read operation is performed in synchronism with HD successively for PD2 and PD4, and then for PD5 and PD7.

<Example 2 of Motion Detection Signal Read Operation>

Figure 7B:
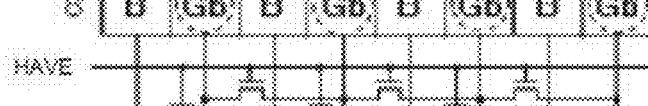
FIG. 7(B) Another configuration diagram schematically showing Examples 1 and 2 of the pixel combining read operation by a pixel section of FIG. 4.

Motion detection signal read operation 2 will be described by using the pixel arrangement of FIG. 7(B) and the operation timing of FIG. 8(B). Motion detection signal read operation 2 reads out a signal obtained by combining (adding or averaging) signals of 16 Gr pixels indicated by solid-line circles, and a signal obtained by combining (adding or averaging) signals of 16 Gb pixels indicated by dotted-line circles so as to generate a differential signal between these two signals in a subsequent stage and perform a motion determination process.

In the signal combination (averaging) operation in the horizontal direction at the horizontal combination circuit 1 (45b), an averaged signal is generated by turning ON the HAVE signal. By turning ON the switches H7B1 and H7B3 and H7B5, output signals from horizontally-arranged four Gr vertical signal lines are averaged. By turning ON the switches H7B2 and H7B4 and H7B6, output signals from horizontally-arranged four Gb vertical signal lines are averaged. Switches of averaging are arranged similarly in the horizontal direction, each averaging four positions.

In this motion detection operation, since the sampling number in the horizontal direction is reduced to ¼, the power consumption is reduced by turning OFF the circuit processes for ¾ the horizontal pixel count, for the CDS circuit 46 and subsequent components.

The operation of combining (adding or averaging) signals of four vertical pixels will be described by using the operation timing shown in FIG. 8(B). In the signal combination (addition or averaging) in the vertical direction, signals of four pixels in the vertical direction are simultaneously output to a vertical signal line by simultaneously turning ON ADRES12 and ADRES34 and ADRES56 and ADRES78 as shown in FIG. 8(B). A signal obtained by combining (averaging) the four output signals is generated on the vertical signal line. This is performed simultaneously with the signal combination (averaging) process in the horizontal direction, thereby combining (adding or averaging) signals of 16 pixels.

First, pulses READ1 and READ3 and READ5 and READ7 and RESET12 and RESET34 and RESET56 and RESET78 of odd-numbered lines are simultaneously generated in synchronism with the horizontal sync signal HD of the timing generation circuit 40, thereby discharging the signal charge which has accumulated in the photodiodes PD1 and PD3 and PD5 and PD7 up to this point in time, thereafter starting the accumulation operation. Then, in synchronism with the passage of the next two HDs, signals are discharged successively from odd-numbered lines for the photodiodes PD9, PD11, . . . The accumulation time is set to the long-period accumulation TL.

Settings are done by the accumulation time generation circuit 41 so that the next short-period accumulation TS is ½ the long-period accumulation TL. Pulses READ2 and READ4 and READ6 and READ8 and RESET12 and RESET34 and RESET56 and RESET78 of even-numbered lines are simultaneously generated in synchronism with a time HD that is ½ the accumulation time TL, thereby discharging the signal charge which has accumulated in the photodiodes PD2 and PD4 and PD6 and PD8 up to this point in time, thereafter starting the accumulation operation. Then, in synchronism with the passage of the next two HDs, signals are discharged successively from four even-numbered lines for the photodiodes PD10, PD12, . . .

Then, in synchronism with the read time HD, the operation of reading out the accumulated signal charge simultaneously applies pulses RESET12 and RSET34 and RESET56 and RSET78 so as to discharge the excessive leak signal accumulated in the detection unit immediately before the read pulses READ1 and READ3 and READ5 and READ7. Then, by simultaneously applying the read pulses READ1 and READ3 and READ5 and READ7, the signal charge which has accumulated in the photodiode is read out to the detection unit, where it is converted to a voltage, which is read out by the output amplifier to the vertical signal line.

During the period from the RESET operation to the signal read operation, by simultaneously turning ON pulses ADREA12 and ADRES34 and ADREA56 and ADRES78, the signals of photodiodes PD1 and PD3 and PD5 and PD7 are simultaneously output as voltage signals to a vertical signal line. By simultaneously turning ON ADRES12 and ADRES34 and ADRES56 and ADRES78, a signal voltage obtained by averaging signals of four pixels in the vertical direction is generated on the vertical signal line. This read operation is performed in synchronism with HD successively for PD2 and PD4 and PD6 and PD8, and then for PD9 and PD11 and PD13 and PD15.

Figure 8A:
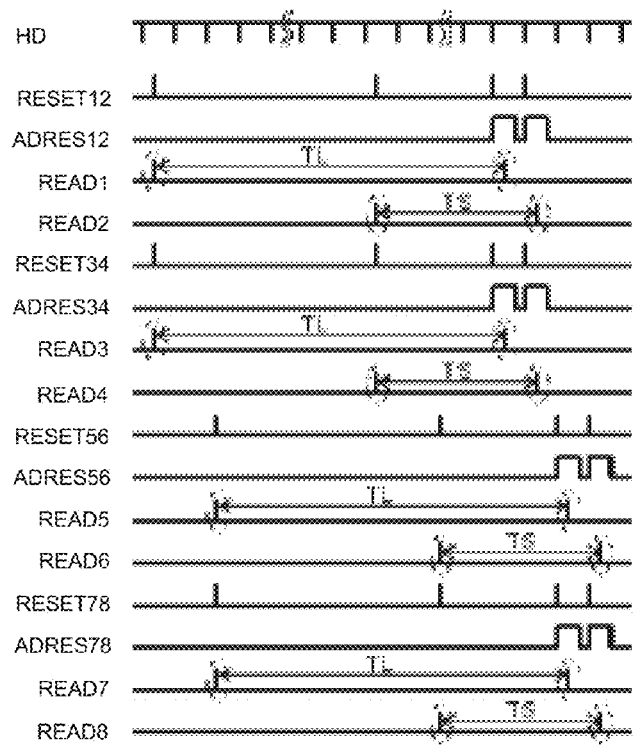
FIG. 8(A) A timing diagram for illustrating a read operation during the motion detection operation of FIG. 7(A).
Figure 8B:
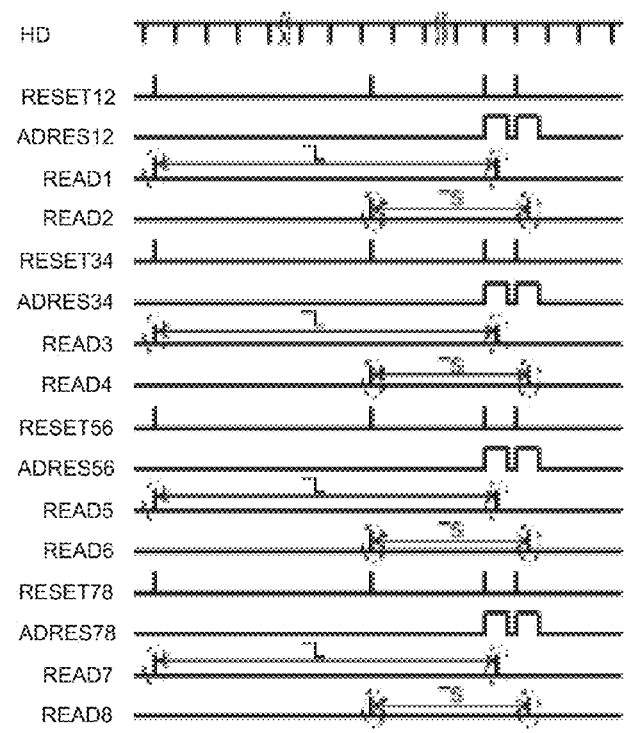
FIG. 8(B) A timing diagram for illustrating a read operation during the motion detection operation of FIG. 7(B).

The moving object detection can be achieved by the signal difference, which is obtained from the long-period accumulation TL and the short-period accumulation TS shown in FIG. 8(A) or FIG. 8(B). Since the amount of signal of the short-period accumulation TS is smaller than that of the long-period accumulation TL according to the amount by which the accumulation time is shorter, the short-period accumulation TS signal is amplified by the coefficient G (accumulation time ratio G=TL/TS) so that the same signal level is achieved for subsequent signal processes. Then, the moving object detection is performed based on the amount of signal difference=TL−G*TS. Although the accumulation time ratio is not limited to 2, the amplifier circuit can be realized by a bit shift and a simple signal process if it is set to 2, 4, 8, or the like.

For a non-moving object, the amount of signal difference is substantially zero (random noise level). For a moving object, a signal representing the difference between the start time of the accumulation time TL, for which the start of accumulation is earlier, and the start time of the accumulation time TS, for which the start of accumulation is later, is generated in the signal of the accumulation time TL. That is, a differential signal is generated at an edge portion of a moving object. A moving object can be detected by determining the amount of differential signal and the frequency of occurrence in the subsequent motion determination circuit.

However, for an edge portion of a non-moving object, the pixel sampling point differs between the long-period accumulation and the short-period accumulation, thereby generating a significant signal difference, thus resulting in a false signal. In view of this, this false signal is significantly reduced by combining the long-accumulated signal and the short-accumulated signal shown in FIG. 7(A) and FIG. 7(B) for a plurality of pixels, and performing the signal combination so that the pixel positions to be sampled overlap with each other. As a result, the moving object detection accuracy improved significantly. Moreover, since signals of a plurality of pixels are combined together, S/N is improved, thereby improving the moving object detection accuracy under a dark environment. Moreover, signals of plurality of pixels are combined together, and the sampling number is thereby significantly reduced to ¼, ¹⁄₁₆, or the like, thus significantly reducing the power consumption during the moving object detecting operation to ¼ and ¹⁄₁₆. Moreover, the detection operation speed can easily be increased by a factor of 4 or 16.

<Example 3 of Motion Detection Signal Read Operation>

Figure 9A:
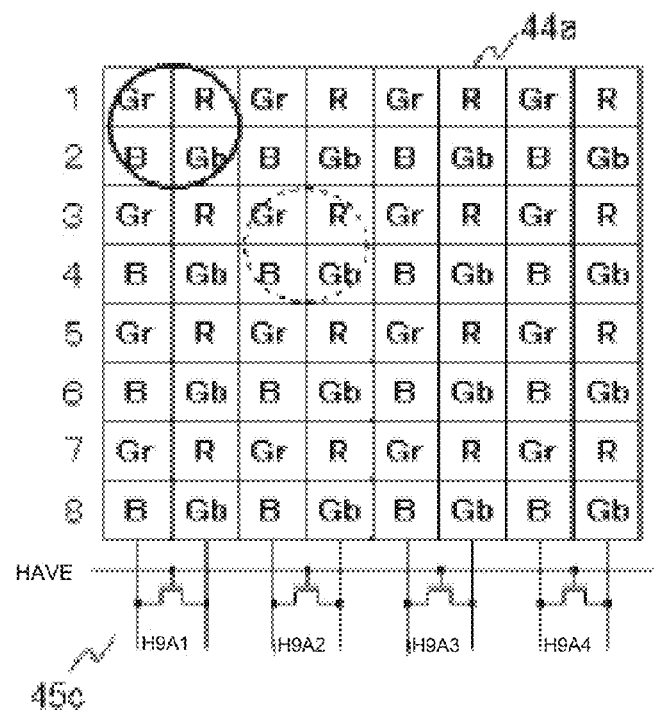
FIG. 9(A) A configuration diagram schematically showing Examples 3 and 4 of the pixel combining read operation by a pixel section of FIG. 4.
Figure 10A:
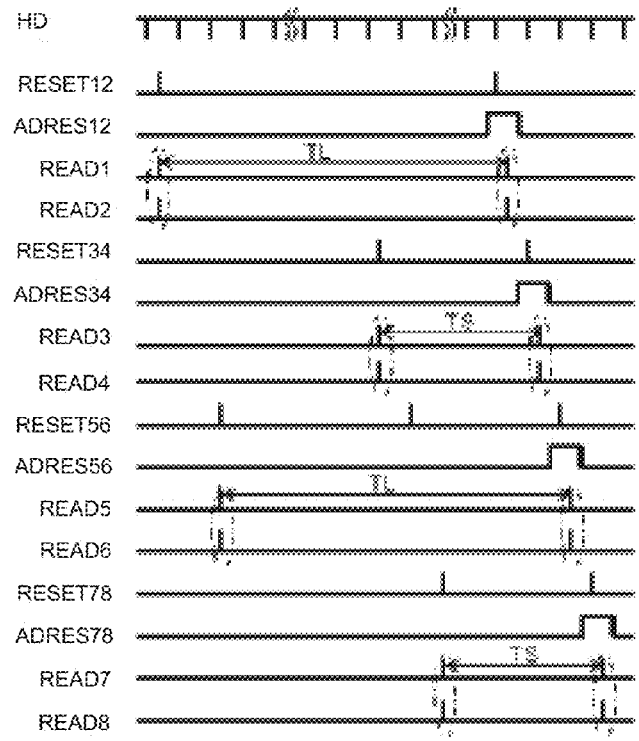
FIG. 10(A) A timing diagram illustrating a read operation during the motion detection operation of FIG. 9(A).

Motion detection signal read operation 3 will be described by using the pixel arrangement of FIG. 9(A) and the operation timing of FIG. 10(A). Motion detection signal read operation 3 reads out a signal obtained by combining (adding or averaging) four (2×2) pixels in a Bayer arrangement indicated by a solid-line circle, and a signal obtained by combining (adding or averaging) four (2×2) pixels in a Bayer arrangement indicated by a dotted-line circle so as to generate a differential signal between these two signals in a subsequent stage and perform a motion determination process.

In the signal combination (averaging) operation in the horizontal direction at the horizontal combination circuit 1 (45c), an averaged signal is generated by turning ON the HAVE signal. By turning ON the switch H9A1, output signals from horizontally-arranged two vertical signal lines indicated by a solid-line circle are averaged. By turning ON the switch H9A2, output signals from horizontally-arranged two vertical signal lines indicated by a dotted-line circle are averaged. Switches for averaging are arranged similarly in the horizontal direction, each averaging two positions.

In this motion detection operation, since the sampling number in the horizontal direction is reduced to ½, it is possible to reduce the power consumption by turning OFF the circuit processes for ½ the horizontal pixel count, for the CDS circuit 46 and subsequent components.

The operation of combining (adding or averaging) signals of two vertical pixels will be described by using the operation timing shown in FIG. 10(A). In the signal combination (addition or averaging) in the vertical direction, by turning ON ADRES12 and simultaneously turning ON READ1 and READ2 as shown in FIG. 10(A), the signal charge accumulated in PD1 and PD2 is read out, and the signal obtained by addition in the detection unit is output by the output amplifier to a vertical signal line. This is performed simultaneously with the signal combination (addition or averaging) process in the horizontal direction, thereby combining (adding or averaging) signals of four pixels.

First, pulses READ1 and READ2 and RESET12 of the first line and the second line are simultaneously generated in synchronism with the horizontal sync signal HD of the timing generation circuit 40, thereby discharging the signal charge which has accumulated in the photodiodes PD1 and PD2 up to this point in time, thereafter starting the accumulation operation. Then, in synchronism with the passage of the next two HDs, signals are similarly discharged from two lines for the photodiodes PD5, PD6, . . . The accumulation time is set to the long-period accumulation TL.

Settings are done by the accumulation time generation circuit 41 so that the next accumulation time is ½ the long-period accumulation TL, i.e., the short-period accumulation TS. Pulses READ3 and READ4 and RESET34 of the following third line and the fourth line are simultaneously generated in synchronism with a time HD that is ½ the accumulation time TL, thereby discharging the signal charge which has accumulated in the photodiodes PD3 and PD4 up to this point in time, thereafter starting the accumulation operation. Then, in synchronism with the passage of the next two HDs, signals are discharged successively from two lines for the photodiodes PD7, PD8 . . .

Then, in synchronism with the read time HD, the operation of reading out the signal charge accumulated in the photodiode applies pulse RESET12 so as to discharge the excessive leak signal accumulated in the detection unit immediately before the read pulses READ1 and READ2. Then, by applying the read pulses READ1 and READ2, the signal charge which has accumulated in the photodiode is read out to the detection unit, where an addition operation is performed for conversion into a voltage, which is read out by the output amplifier to the vertical signal line.

This read operation is performed, in synchronism with HD, successively for PD3 and PD4, PD5 and PD6, . . .

Together with the horizontal signal combination (addition or averaging) process, the operation of combining (adding or averaging) signals of four pixels in a Bayer arrangement is performed.

<Example 4 of Motion Detection Signal Read Operation>

Figure 9B:
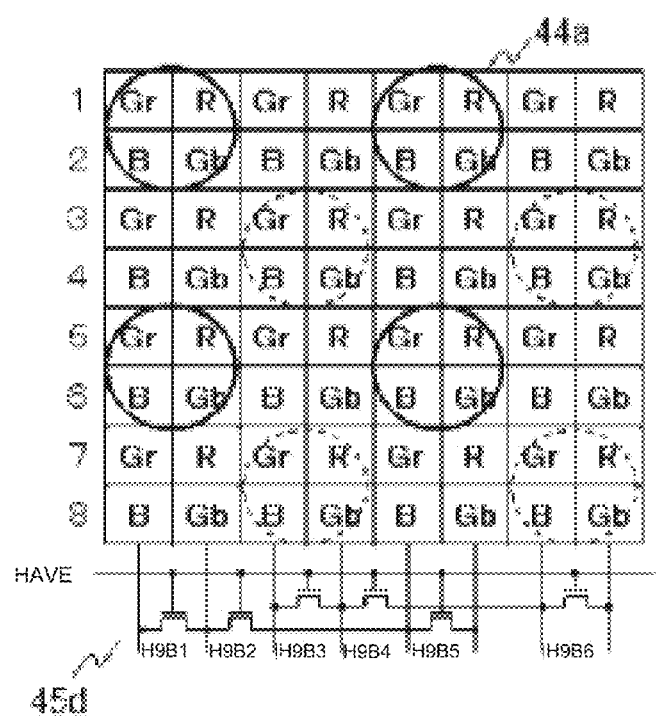
FIG. 9(B) Another configuration diagram schematically showing Examples 3 and 4 of the pixel combining read operation by a pixel section of FIG. 4.
Figure 10B:
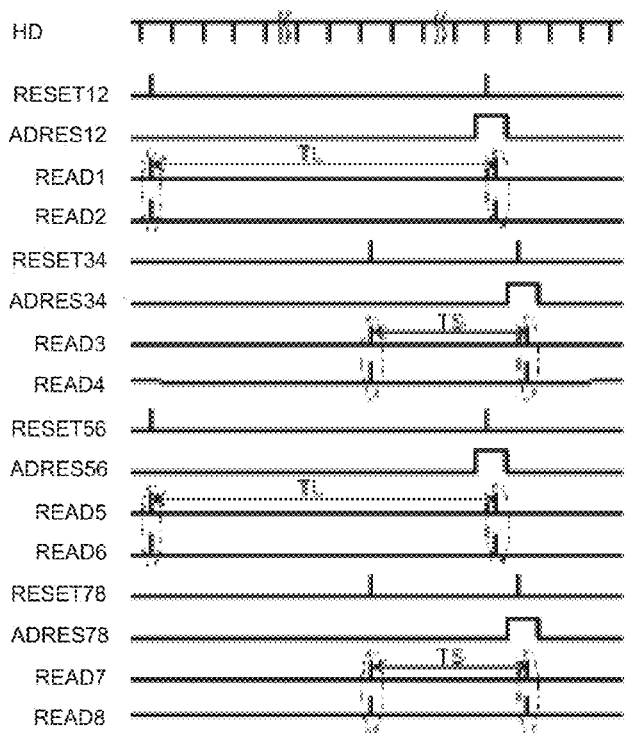
FIG. 10(B) A timing diagram illustrating a read operation during the motion detection operation of FIG. 9(B).

Motion detection signal read operation 4 will be described by using the pixel arrangement of FIG. 9(B) and the operation timing of FIG. 10(B). Motion detection signal read operation 4 reads out a signal obtained by combining (adding or averaging) a total of 16 pixels from four locations each including four (2×2) pixels in a Bayer arrangement indicated by a solid-line circle, and a signal obtained by combining (adding or averaging) a total of 16 pixels from four locations each including four (2×2) pixels in a Bayer arrangement indicated by a dotted-line circle so as to generate a differential signal between these two signals in a subsequent stage and perform a motion determination process.

In the signal combination (averaging) operation in the horizontal direction at the horizontal combination circuit 1 (45d), an averaged signal is generated by turning ON the HAVE signal. By turning ON the switches H9B1 and H9B2 and H9B5, output signals from horizontally-arranged four vertical signal lines indicated by solid-line circles are averaged. By turning ON the switches H9B3 and H9B4 and H9B6, output signals from horizontally-arranged four vertical signal lines indicated by dotted-line circles are averaged. Switches for averaging are arranged similarly in the horizontal direction, each averaging four positions.

In this motion detection operation, since the sampling number in the horizontal direction is reduced to ¼, it is possible to reduce the power consumption by turning OFF the circuit processes for ¾ the horizontal pixel count, for the CDS circuit 46 and subsequent components.

The operation of combining (adding or averaging) signals of four vertical pixels will be described by using the operation timing shown in FIG. 10(A). In the signal combination (addition or averaging) in the vertical direction, by turning ON ADRES56 simultaneously with ADRES12 as shown in FIG. 10(B), and simultaneously turning ON READ1 and READ2 and READ5 and READ6, the signal charge accumulated in PD1 and PD2 and PD5 and PD6 is read out, and signals obtained by addition in the detection unit are output from the output amplifiers of ADRES12 and ADRES56 to a vertical signal line. There is generated a signal obtained by combining (averaging) signals output from two positions on the vertical signal line. This is performed simultaneously with the signal combination (averaging) process in the horizontal direction, thereby combining (adding or averaging) signals of 16 pixels.

First, pulses READ1 and READ2 and READ5 and READ6 and RESET12 and RESET56 of the first line and the second line and the fifth line and the sixth line are simultaneously generated in synchronism with the horizontal sync signal HD of the timing generation circuit 40, thereby discharging the signal charge which has accumulated in the photodiodes PD1 and PD2 and PD5 and PD6 up to this point in time, thereafter starting the accumulation operation. Then, in synchronism with the passage of the next two HDs, signals are similarly discharged successively from four lines for the photodiodes PD9, PD10, . . . The accumulation time is set to the long-period accumulation TL.

Settings are done by the accumulation time generation circuit 41 so that the next accumulation time is ½ the long-period accumulation TL, i.e., the short-period accumulation TS. Pulses READ3 and READ4 and READ7 and READ8 and RESET34 and RESET78 of the next third line and the fourth line and the seventh line and the eighth line are simultaneously generated in synchronism with a time HD that is ½ the accumulation time TL, thereby discharging the signal charge which has accumulated in the photodiodes PD3 and PD4 and PD7 and PD8 up to this point in time, thereafter starting the accumulation operation. Then, in synchronism with the passage of the next two HDs, signals are discharged successively from four lines for the photodiodes PD11, PD12, . . .

Then, in synchronism with the read time HD, the operation of reading out the accumulated signal charge simultaneously applies pulses RESET12 and RESET56 so as to discharge the excessive leak signal accumulated in the detection unit immediately before the read pulses READ1 and READ2 and READ5 and READ6. Then, by simultaneously applying the read pulses READ1 and READ2 and READ5 and READ6, the signal charge which has accumulated in the photodiode is read out to the detection unit, where an addition is performed for conversion into a voltage, which is output from the output amplifier to the vertical signal line.

During the period from the RESET operation to the signal read operation, by simultaneously turning ON pulses ADREA12 and ADREA56, an added PD1-PD2 signal and an added PD5-PD6 signal are output to a vertical signal line. A signal voltage obtained by combining (adding and averaging) signals of four pixels in the vertical direction is generated on the vertical signal line. This read operation is performed in synchronism with HD successively for PD3 and PD4 and PD7 and PD8, and then for PD9 and PD10 and PD13 and PD14.

<Example 2 of Motion Detection Solid-State Image-Capturing Device>

Figure 11:
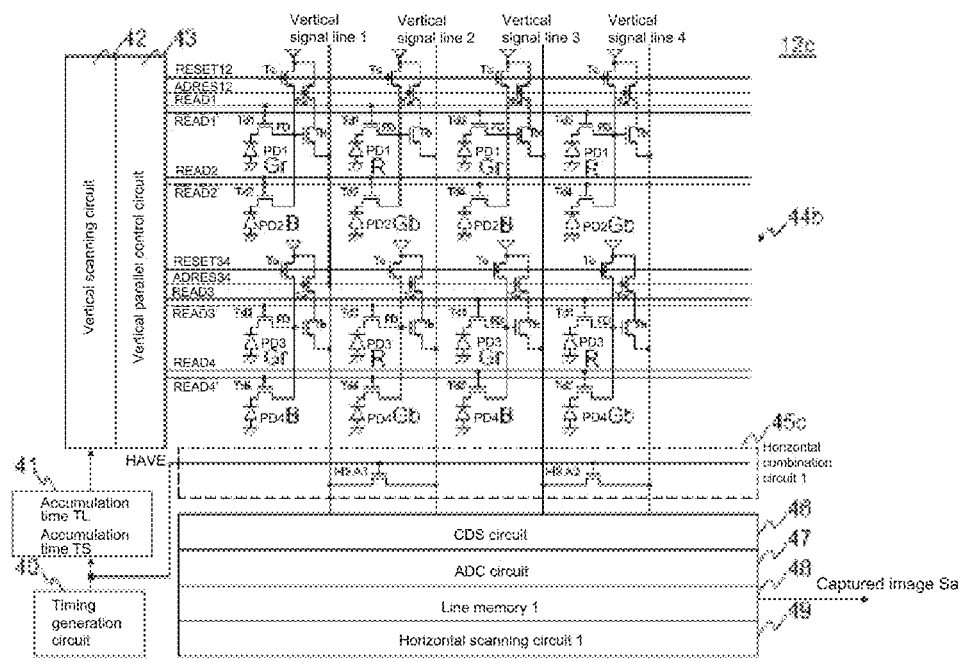
FIG. 11 A block diagram showing a schematic configuration of Example 2 of the motion detection solid-state image-capturing device of FIG. 3.

First, a configuration example of the solid-state image-capturing device 12c according to Embodiment 3 of the motion detection system will be described with reference to FIG. 11. A pixel section 44b and a horizontal combination circuit 1 (45*c*), which are different from Example 1 (FIG. 4) of the motion detection solid-state image-capturing device will be described.

Each cell of the pixel section 44*b* includes four transistors (Ta, Tb, Tc and Td) and two photodiodes (PD1 and PD2), and pulse signals ADRESn and RESETn are supplied to each cell. Two lines READn and READn' are provided for reading out from the photodiodes. They are connected to read transistors (Td) of pixels so that they alternate, both in the horizontal direction and in the vertical direction, by the unit of 2×2 pixels of a Bayer arrangement. On the upper side of this pixel section 44*b*, load transistors for the source follower circuit are arranged along the horizontal direction.

The vertical signal linen n carrying outputs from the pixel section 44*b* are connected to the CDS circuit 46 via the horizontal combination circuit 1 (45*c*). In the horizontal combination circuit 1 (45*c*), each pair of adjacent vertical signal lines n are connected together by the switch transistor H9An. The gate of this transistor is controlled by the HAVE signal of the timing generation circuit 40. By turning ON this HAVE signal, signals output to two vertical signal lines are horizontally combined (averaged). Moreover, in the vertical parallel control circuit 43, by simultaneously turning ON a plurality of vertical read lines, pixel signals arranged vertically can be vertically combined (averaged).

Figure 12:
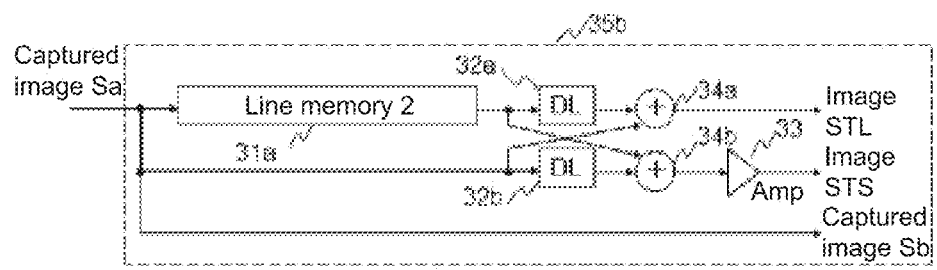
FIG. 12 A configuration diagram showing a pixel combination circuit and a captured image signal separation circuit according to the signal process of Example 2 of FIG. 3.

FIG. 12 shows a pixel combination circuit and a captured image signal separation circuit 35*b* according to the signal process of Configuration Example 2.

The captured image signal separation circuit 35*b* includes: a line memory 2 (31*a*) for delaying the captured image signal Sa by one horizontal (1H) period; delay circuits DL (32*a* and 32*b*) for delaying by pixels; addition circuits (34*a* and 34*b*) for cross-adding the captured image signal Sa and the output signal from the line memory 2 (31*a*) with signals obtained by delaying them by one pixel; and the amplifier circuit 33 for amplifying either one of the captured image signal having undergone the addition.

During the motion detection operation:

The captured image signal a output from the image-capturing device 12*b* is output as a long-accumulated image STL signal as the output signal from an addition circuit 34*a* that adds the captured image signal a with the delay circuit DL (32*a*), which further delays, by the unit of pixels, the captured image signal a which has been delayed by one horizontal (HD) period through the line memory 2 (31*a*).

Moreover, the captured image signal a output from the image-capturing device 12*b* is output as a short-accumulated image STS signal by amplifying a signal through the amplifier circuit 33, which signal is obtained by the addition circuit 34*b* adding together a signal that has been delayed by the unit of pixels through the delay circuit (32*b*) and a signal that has been delayed by one horizontal (HD) period through the line memory 2 (31*a*).

Immediately after detecting a moving object, photodiodes of all pixels are subjected to a long-term accumulation operation as a full-resolution operation, thereby outputting the captured image signal Sa, as it is, as the captured image signal Sb. An image-capturing operation is performed for a predetermined amount of time which is set in advance, e.g., 10 seconds, after which the operation mode is switched to the motion detection operation, wherein the motion detection is performed with a reduced power consumption in which the sampling number is reduced through the signal combination operation.

<Example 5 of Motion Detection Signal Read Operation>

Figure 13A:
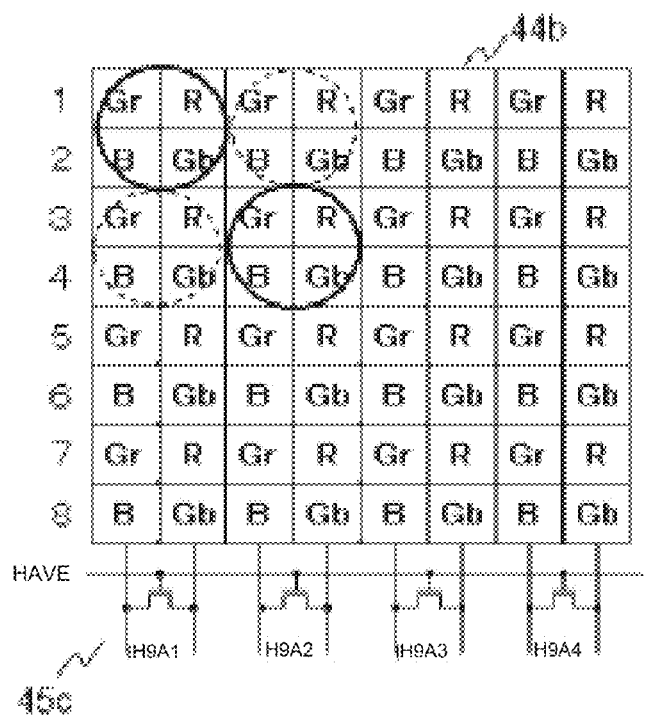
FIG. 13(A) A configuration diagram schematically showing Examples 5 and 6 of the pixel combining read operation by a pixel section of FIG. 11.
Figure 14A:
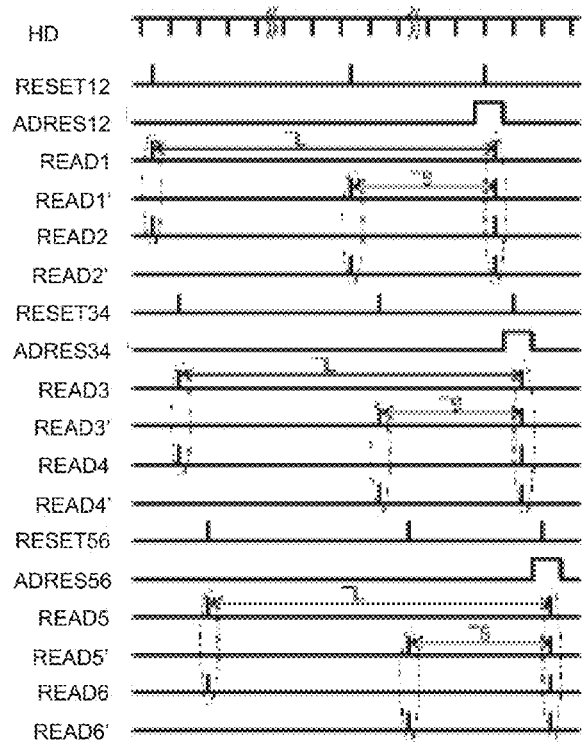
FIG. 14(A) A timing diagram illustrating a read operation during the motion detection operation of FIG. 13(A).

Motion detection signal read operation 5 will be described by using the pixel arrangement of FIG. 13(A) and the operation timing of FIG. 14(A). Motion detection signal read operation 5 reads out a signal obtained by combining (adding or averaging) a total of eight pixels (including a set of four (2×2) pixels in a Bayer arrangement and another diagonally-adjacent set of four pixels in a Bayer arrangement indicated by solid-line circles), and a signal obtained by combining (adding or averaging) two diagonally-adjacent sets of four (2×2) pixels in a Bayer arrangement indicated by dotted-line circles, so as to generate a differential signal between these two signals in a subsequent stage and perform a motion determination process.

In the signal combination (averaging) operation in the horizontal direction at the horizontal combination circuit 1 (45*c*), an averaged signal is generated by turning ON the HAVE signal. By turning ON the switch H9A1, output signals from horizontally-arranged two vertical signal lines are averaged. By turning ON the switch H9A2, output signals from a next pair of two adjacent vertical signal lines are averaged. Switches for averaging are arranged similarly in the horizontal direction, thereby successively averaging output signals from pairs of two adjacent vertical signal lines.

In this motion detection operation, since the sampling number in the horizontal direction is reduced to ½, it is possible to reduce the power consumption by turning OFF the circuit processes for ½ the horizontal pixel count, for the CDS circuit 46 and subsequent components.

The operation of combining (adding or averaging) signals of two vertical pixels will be described by using the operation timing shown in FIG. 14(A). In the signal combination (addition or averaging) in the vertical direction, by turning ON ADRES12 and simultaneously turning ON READ1 and READ2 and READ1' and READ2' as shown in FIG. 14(A), the signal charge accumulated in PD1 and PD2 is read out, and the signal obtained by addition in the detection unit is output by the output amplifier to a vertical signal line. This is performed simultaneously with the signal combination (addition or averaging) process in the horizontal direction, thereby combining (adding or averaging) four pixels.

First, pulses READ1 and READ2 and RESET12 of the first line and the second line are simultaneously generated in synchronism with the horizontal sync signal HD of the timing generation circuit 40, thereby discharging the signal charge which has accumulated in the photodiodes PD1 and PD2 for long-period accumulation up to this point in time, thereafter starting the accumulation operation. Then, in synchronism with the passage of the next one HD, signals are similarly discharged successively from two lines for the photodiodes PD3, PD4, . . . The accumulation time is set to the long-period accumulation TL.

Settings are done by the accumulation time generation circuit 41 so that the next accumulation time is ½ the long-period accumulation TL, i.e., the short-period accumulation TS. Pulses READ1' and READ2' and RESET12 of the first line and the second line are simultaneously generated in synchronism with a time HD that is ½ the accumulation time TL, thereby discharging the signal charge which has accumulated in the photodiodes PD1 and PD2 for short-period accumulation up to this point in time, thereafter starting the accumulation operation. Then, in synchronism with the passage of the next one HD, signals are discharged successively from two lines for the photodiodes PD3, PD4, . . .

Then, in synchronism with the read time HD, the operation of reading out the signal charge accumulated in the photodiode applies pulse RESET12 so as to discharge the excessive leak signal accumulated in the detection unit immediately before the read pulses READ1 and READ2 and READ1' and READ2'. Then, by simultaneously applying the read pulses READ1 and READ2 and READ1' and READ2', the signal charge which has accumulated in the photodiode is read out to the detection unit, where an addition operation is performed for conversion into a voltage, which is read out by the output amplifier to the vertical signal line.

This read operation is performed, in synchronism with HD, successively for PD3 and PD4, PD5 and PD6, . . .

Together with the horizontal signal combination (averaging) process, the operation of combining (adding or averaging) signals of four pixels in a Bayer arrangement is performed.

<Example 6 of Motion Detection Signal Read Operation>

Motion detection signal read operation 6 will be described by using the pixel arrangement of FIG. 13(B) and the operation timing of FIG. 14(B). Motion detection signal read operation 6 reads out a signal obtained by combining (adding or averaging) a total of 32 pixels from eight locations each including four (2×2) pixels in a Bayer arrangement indicated by solid-line circles, and a signal obtained by combining (adding or averaging) a total of 32 pixels from eight locations each including four (2×2) pixels in a Bayer arrangement indicated by dotted-line circles so as to generate a differential signal between these two signals in a subsequent stage and perform a motion determination process.

In the signal combination (averaging) operation in the horizontal direction at the horizontal combination circuit 1 (45d), an averaged signal is generated by turning ON the HAVE signal. By turning ON the switches H9B1 and H9B2 and H9B5, output signals from horizontally-arranged four vertical signal lines (vertical lines 1 and 2 and 5 and 6) indicated by solid-line circles are averaged. By turning ON the switches H9B3 and H9B4 and H9B6, output signals from horizontally-arranged four vertical signal lines (vertical lines 1 and 2 and 5 and 6) indicated by dotted-line circles are averaged. Switches for averaging are arranged similarly in the horizontal direction, each averaging four positions.

In this motion detection operation, since the sampling number in the horizontal direction is reduced to ¼, it is possible to reduce the power consumption by turning OFF the circuit processes for ¾ the horizontal pixel count, for the CDS circuit 46 and subsequent components.

The operation of combining (adding or averaging) signals of four vertical pixels will be described by using the operation timing shown in FIG. 14(B). In the signal combination (addition or averaging) in the vertical direction, by turning ON ADRES12 and simultaneously turning ON READ1 and READ2 and READ1' and READ2' as shown in FIG. 14(B), the signal charge accumulated in PD1 and PD2 is read out, and the signal obtained by addition in the detection unit is output by the output amplifier to a vertical signal line.

Then, by simultaneously turning ON ADRES56 and simultaneously turning ON READ5 and READ6 and READ5' and READ6', the signal charge accumulated in PD5 and PD6 is read out, and the signal obtained by addition in the detection unit is output by the output amplifier to a vertical signal line. Signals output from two positions of ADRES12 and ADRES56 are combined together (averaged) on the vertical signal line to generate a combined signal. This is performed simultaneously with the signal combination (addition or averaging) process in the horizontal direction, thereby combining (adding or averaging) signals of 16 pixels.

First, pulses READ1 and READ2 and READ5 and READ6 and RESET12 and RESET56 of the first line and the second line and the fifth line and the sixth line are simultaneously generated in synchronism with the horizontal sync signal HD of the timing generation circuit 40, thereby discharging the signal charge which has accumulated in the long-accumulation-period photodiodes PD1 and PD2 and PD5 and PD6 up to this point in time, thereafter starting the accumulation operation. Then, in synchronism with the passage of the next one HD, signals are discharged successively from four lines for the photodiodes PD3, PD4, PD7, PD8, . . . The accumulation time is set to the long-period accumulation TL.

Settings are done by the accumulation time generation circuit 41 so that the next accumulation time is ½ the long-period accumulation TL, i.e., the short-period accumulation TS. Pulses READ1' and READ2' and READ5' and READ6' and RESET12 and RESET56 of the first line and the second line and the fifth line and the sixth line are simultaneously generated in synchronism with a time HD that is ½ the accumulation time TL, thereby discharging the signal charge which has accumulated in the short-accumulation-period photodiodes PD1 and PD2 and PD5 and PD6 up to this point in time, thereafter starting the accumulation operation. Then, in synchronism with the passage of the next one HD, signals are discharged successively from four lines for the short-accumulation-period photodiodes PD3, PD4, PD7, PD8, . . .

Then, in synchronism with the read time HD, the operation of reading out the accumulated signal charge simultaneously applies pulses RESET12 and RESET56 so as to discharge the excessive leak signal accumulated in the detection unit immediately before the read pulses READ1 and READ2 and READ5 and READ6 and READ1' and READ2' and READ5' and READ6'. Then, by applying the read pulses READ1 and READ2 and READ5 and READ6 and READ1' and READ2' and READ5' and READ6', the signal charge which has accumulated in the photodiode is read out to the detection unit, where it is converted to a voltage, which is read out by the output amplifier.

During the period from the RESET operation to the signal read operation, by simultaneously turning ON pulses ADREA12 and ADREA56, a signal obtained by adding together the signals of PD1 and PD2 in the detection unit and a signal obtained by adding together the signals of PD5 and PD6 in the detection unit are output as voltage signals to a vertical signal line. By simultaneously turning ON ADRES12 and ADRES56, a signal voltage obtained by combining (averaging) signals of a total of four vertical pixels is generated is generated on the vertical signal line. This read operation is successively performed in synchronism with HD successively for PD3 and PD4 and PD7 and PD8, and then for PD9 and PD10 and PD13 and PD14.

Figure 13B:
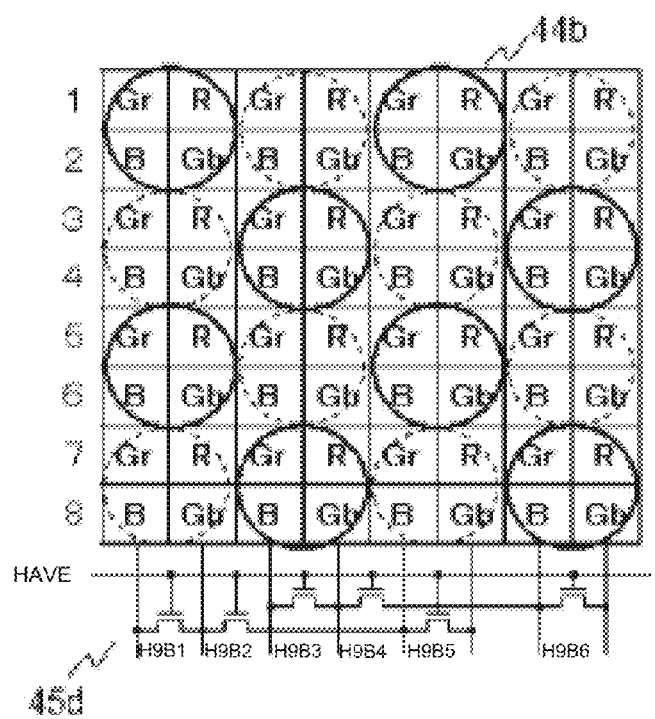
FIG. 13(B) Another configuration diagram schematically showing Examples 5 and 6 of the pixel combining read operation by a pixel section of FIG. 11.
Figure 14B:
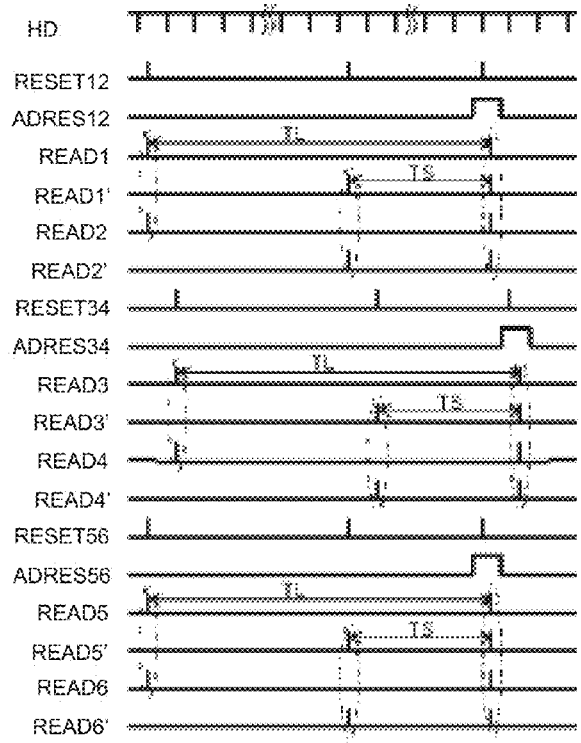
FIG. 14(B) A timing diagram illustrating a read operation during the motion detection operation of FIG. 13(B).

Through these processes, a motion detection differential process is performed for eight positions indicated by solid-line circles and eight positions indicated by dotted-line circles in FIG. 13(B).

<Embodiment 4 of Motion Detection System>

Figure 15:
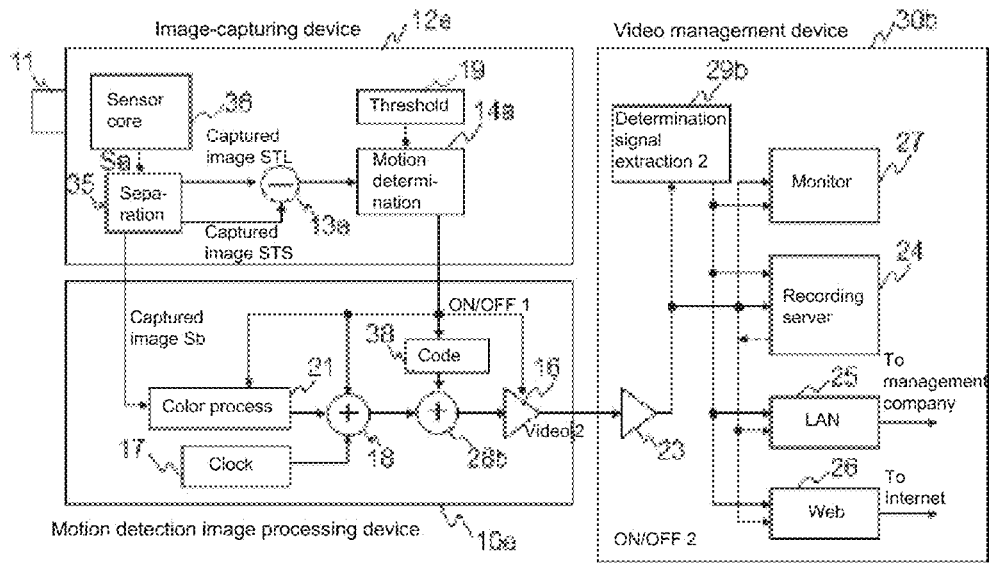
FIG. 15 A block diagram showing a schematic configuration of a motion detection system according to a fourth embodiment of the present invention.

FIG. 15 is a block diagram showing a schematic configuration of a motion detection system according to Embodiment 4 of the present invention.

The present motion detection system of Embodiment 4 includes a motion detection camera and a video management device 30b, wherein the motion detection camera is composed of an image-capturing device 12e including an image-capturing lens 11, and a motion detection image processing device 10e. Configurations and operations that are different from those of Embodiment 3 will be described.

The image-capturing device 12e includes a sensor core unit 36 and a motion detection unit. The sensor core unit 36 has a similar configuration to that of a solid-state image-capturing device of FIG. 4 or FIG. 11.

The motion detection image processing device 10e receives the captured image signal Sb, and includes the color signal processing circuit 21, a time generation circuit 17, a code generation circuit 38 for generating a code for embedding a motion determination signal (ON/OFF1) in the video signal, a motion determination signal addition circuit 28b, and the video signal output circuit 16.

The captured image signal Sa output from the sensor core unit 36 is divided by the captured image signal separation circuit 35 into the long-accumulated captured image signal STL and the short-accumulated captured image signal STS, simultaneously outputting the captured image signal STL and the captured image signal STS, for the pixel to be compared. And a differential signal is generated in the differential signal generation circuit 13a, and the motion determination circuit 14a determines the presence/absence of a moving object, thereby outputting the determination signal (ON/OFF1) from the image-capturing device 12e.

The captured image signal separation circuit 35 has a similar configuration to that of FIG. 5 or FIG. 12.

<Embodiment 5 of Motion Detection System>

Figure 16:
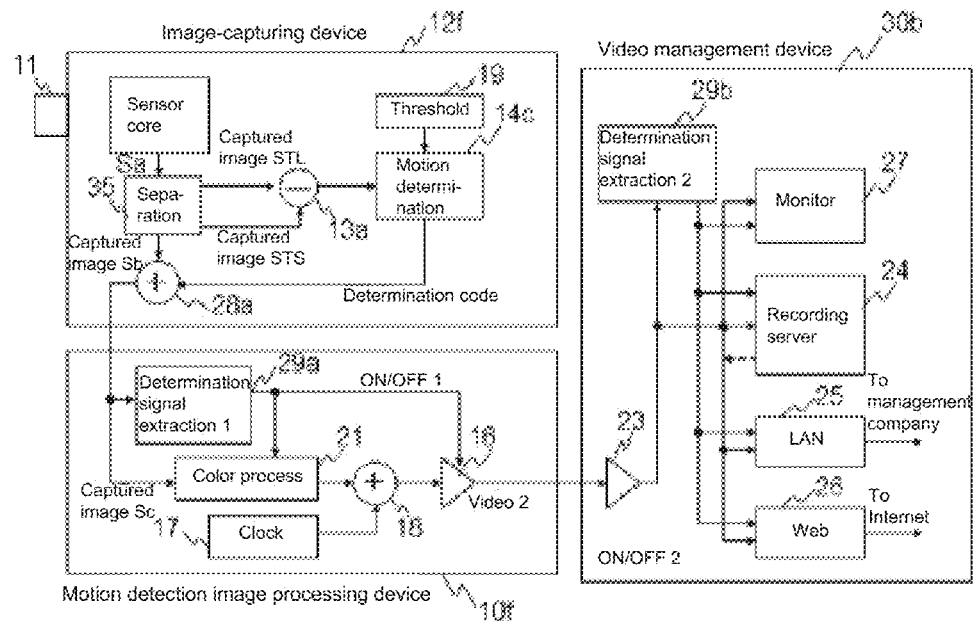
FIG. 16 A block diagram showing a schematic configuration of a motion detection system according to a fifth embodiment of the present invention.

FIG. 16 is a block diagram showing a schematic configuration of a motion detection system according to Embodiment 5 of the present invention.

The present motion detection system of Embodiment 5 includes a motion detection camera and a video management device 30b, wherein the motion detection camera is composed of an image-capturing device 12f including an image-capturing lens 11, and a motion detection image processing device 10f.

In the image-capturing device 12f, as compared with Embodiment 4, only the motion determination code is output from a motion determination circuit 14c, and a motion determination signal addition circuit 28a is added for embedding the motion determination code in the captured image signal Sa, thus outputting a captured image signal Sc with the motion determination code embedded therein.

As opposed to Embodiment 4, the motion detection image processing device 10f includes a motion determination signal extraction circuit 29a, which is used to extract the determination code embedded in the received captured image signal Sc, thus extracting and outputting the embedded motion determination signal (ON/OFF1). Where it is determined that there is no movement, circuit operations and signal processing operations of the color signal processing circuit 21, the video signal output circuit 16, etc., are stopped.

<Embodiment 6 of Motion Detection System>

Figure 17:
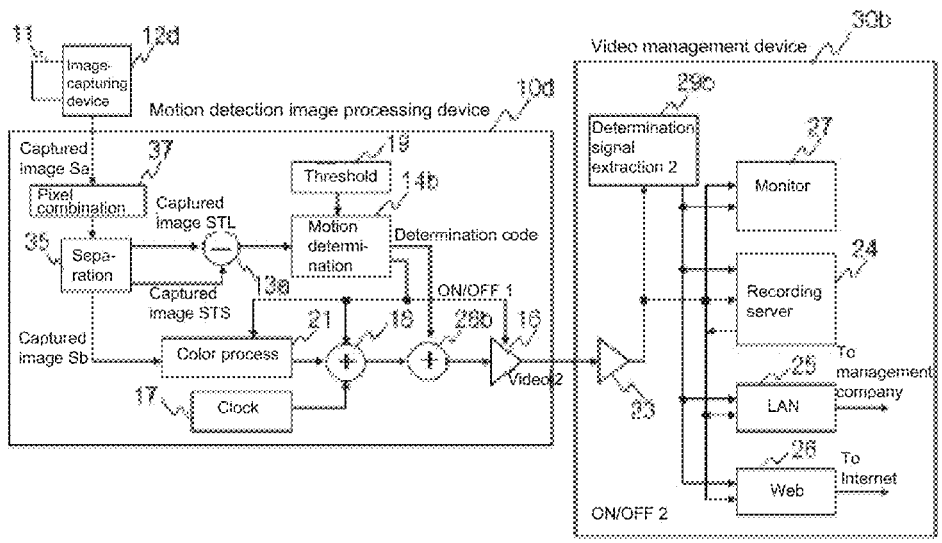
FIG. 17 A block diagram showing a schematic configuration of a motion detection system according to a sixth embodiment of the present invention.

FIG. 17 is a block diagram showing a schematic configuration of a motion detection system according to Embodiment 6 of the present invention.

The present motion detection system of Embodiment 6 includes a motion detection camera and a video management device 30b, wherein the motion detection camera is composed of an image-capturing device 12d including an image-capturing lens 11, and a motion detection image processing device 10d.

The image-capturing device 12d outputs signals from all pixels of the pixel section as captured image signals Sa without reducing the sampling number even in the motion detection operation.

In the motion detection image processing device 10d, a pixel signal combination circuit 37 combines together (adds) signals from a plurality of pixels, i.e., captured image signals Sa from all pixels, from the image-capturing device 12d, thereby outputting the result to the captured image signal separation circuit 35.

Otherwise, the configuration is the same as that of Embodiment 3.

<Example 3 of Motion Detection Solid-State Image-Capturing Device>

Figure 18:
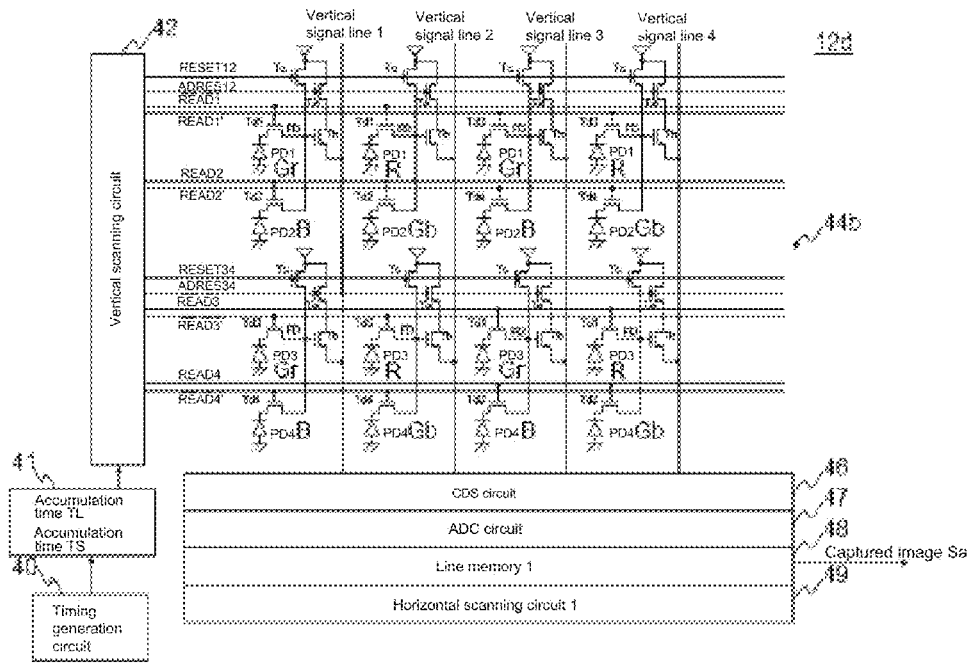
FIG. 18 A block diagram showing a schematic configuration of Example 3 of the motion detection image-capturing device of FIG. 17.

A configuration example of the solid-state image-capturing device 12d according to Embodiment 6 of the motion detection system will be described with reference to FIG. 18. As compared with the solid-state image-capturing device 12c of Example 2 of the motion detection solid-state image-capturing device (FIG. 11), the vertical parallel control circuit 43 and the horizontal combination circuit 1 (45c) are absent because the reduction of the sampling number is not performed. The image-capturing device 12d has a simpler configuration as a result of the circuit reduction.

Figure 19:
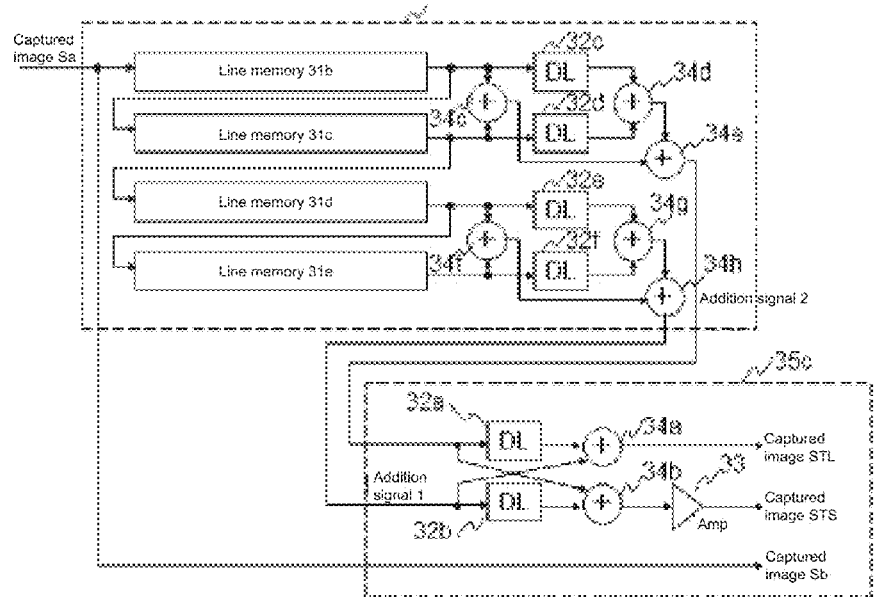
FIG. 19 A configuration example diagram showing a pixel combination circuit and a captured image signal separation circuit according to the signal process of Example 3 of FIG. 17.

FIG. 19 shows a captured image signal separation circuit 35c, and the pixel combination circuit 37 implemented by signal processes of captured image signals according to Configuration Example 3. A method for combining pixel signals shown in FIG. 13A will be described. The captured image signal combination circuit 37 includes line memories 31b to 31e for four lines (at least three lines) so that it is possible to successively perform arithmetic operations on signals by the unit of four lines output from the image-capturing area of the motion detection image-capturing device 12d, and the captured image signal combination circuit 37 generates, from the received pixel signals of four lines, a first addition signal for four pixels (two vertical pixels and two horizontal pixels) corresponding to pixels of the upper two lines, and a second addition signal for four pixels (two vertical pixels and two horizontal pixels) corresponding to pixels of the lower two lines.

In the captured image signal separation circuit 35c:

as shown in FIG. 13A, a signal obtained by the four-pixel addition indicated by a solid-line circle and a signal obtained by the four-pixel addition indicated by a dotted-line circle are input as the first signal and the second signal. The captured image signal separation circuit 35c needs to cross-add signals.

The first addition signal and the second addition signal are delayed by delay means by one pixel;

a third addition signal is generated by adding together an un-delayed first addition signal and a delayed second addition signal;

a fourth addition signal is generated by adding together an un-delayed second addition signal and a delayed first addition signal; and either the third captured image signal or the fourth captured image signal is amplified, thereby outputting at least two kinds of captured image signals, including an amplified short-accumulation-time captured image signal STS, and an un-amplified long-accumulation-time captured image signal STL.

<Embodiment 7 of Motion Detection System>

Figure 20:
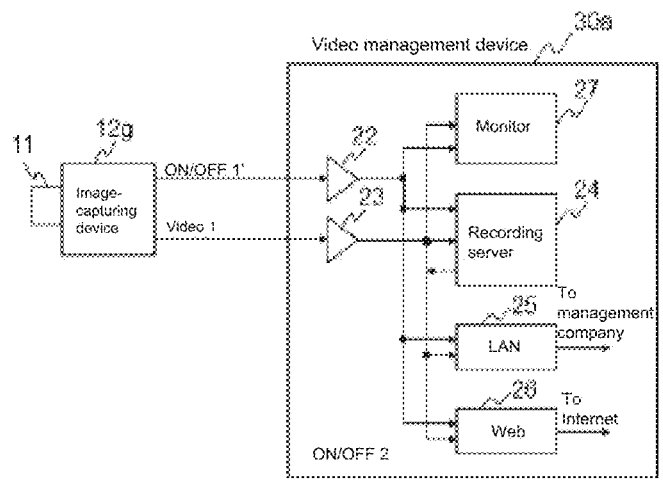
FIG. 20 A block diagram showing a schematic configuration of a motion detection system according to a seventh embodiment of the present invention.

FIG. 20 is a block diagram showing a schematic configuration of a motion detection system according to Embodiment 7 of the present invention.

The present motion detection system of Embodiment 7 includes a motion detection image-capturing device 12g (a motion detection camera) including an image-capturing lens 11, and a video management device 30a. For example, the image-capturing device 12g includes the circuit of the motion detection image processing device 10c of Embodiment 3 (FIG. 3) incorporated, on-chip, into the image-capturing device 12g. As in Embodiment 2 (FIG. 2), the motion determination signal may be embedded in the video signal 1 of the image-capturing device 12g, and the video management device 30b may be used in combination, so that only the video signal 1 can be output.

Figure 21:
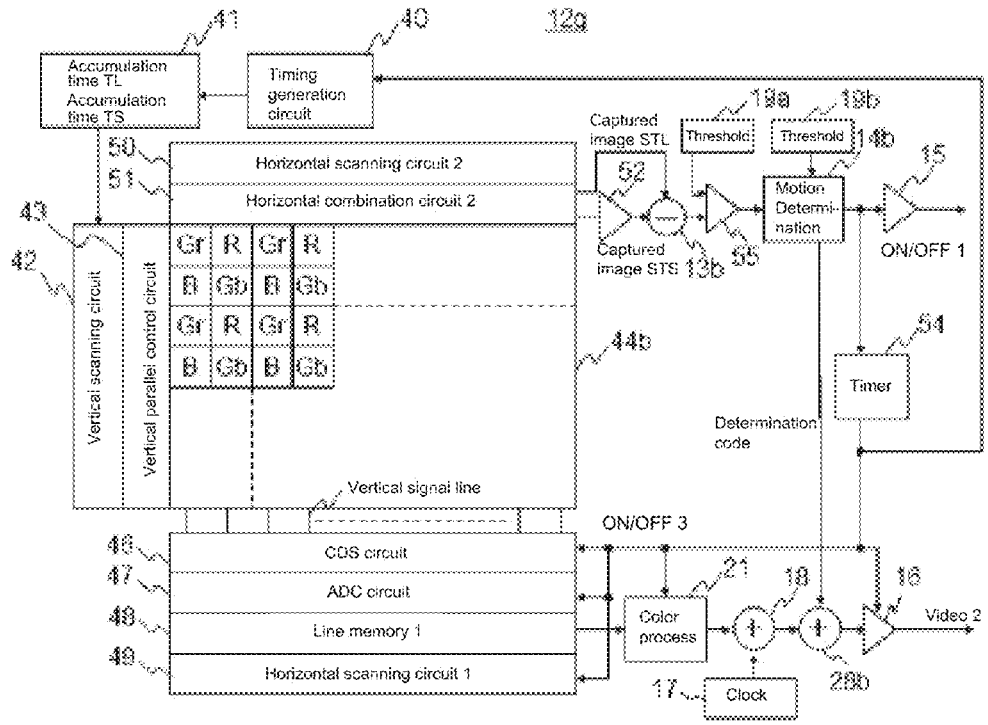
FIG. 21 A block diagram showing a schematic configuration of a motion detection solid-state image-capturing device according to the seventh embodiment of the present invention.

FIG. 21 is a block diagram showing a schematic configuration of the image-capturing device 12g of the motion detection system according to Embodiment 7 of the present invention. The image-capturing device 12g is an one-chip solid-state image-capturing device including the motion determination circuit 14b and the color signal processing circuit 21, etc., incorporated into a sensor chip. Configurations and operations that are different from those of Embodiment 3 will be described.

In a lower section of the pixel section 44b, the image-capturing device 12g includes a column-type noise cancellation circuit (CDS) 46 receiving vertical signal lines output from the pixel section 44b, a column-type analog-to-digital converter circuit (AD conversion) 47, a line memory 1 (48), and a horizontal scanning circuit 1 (49).

In an upper section of the pixel section 44b, it includes a horizontal combination circuit 2 for receiving vertical signal lines output from the pixel section 44b to combine together signals in the horizontal direction, and a horizontal scanning circuit 2 (50) for scanning to read in the horizontal direction.

As for the captured image signal for motion determination, an analog signal is output as the long-accumulated captured image signal STL and the short-accumulated captured image signal STS averaged by using the horizontal scanning circuit 2 (50) and the horizontal combination circuit 2 (51), and the signal level is adjusted by an analog amplifier circuit 52 for correcting the difference in the accumulation time. A differential signal of the output of the amplifier circuit 52 is generated by a differential signal generation circuit 13b, which is an analog differential amplifier. Then, an analog comparator circuit 55 is used to convert it into a digital value of a higher level than the threshold set by a threshold setting circuit 19a, and the presence/absence of a motion is determined by the motion determination circuit 14b.

Where it is determined by the motion determination circuit 14b that there is a motion, the motion determination signal (ON/OFF1) is passed via a timer circuit 54 to output an ON signal for operating various circuits. After an image-capturing operation is performed for a predetermined amount of time which is set in advance, e.g., 10 seconds, the timer circuit 45 switches the operation mode of the timing generation circuit from the image-capturing mode to the motion detection operation mode to perform a motion detection.

Where it is determined by the motion determination circuit 14b that there is no motion, the circuit operation of the CDS circuit in the lower section and subsequent components are turned OFF, thereby significantly reducing the power consumption of the image-capturing device 12g. Then, the motion detection operation is continued.

<Example 7 of Motion Detection Signal Read Operation>

Figure 22:
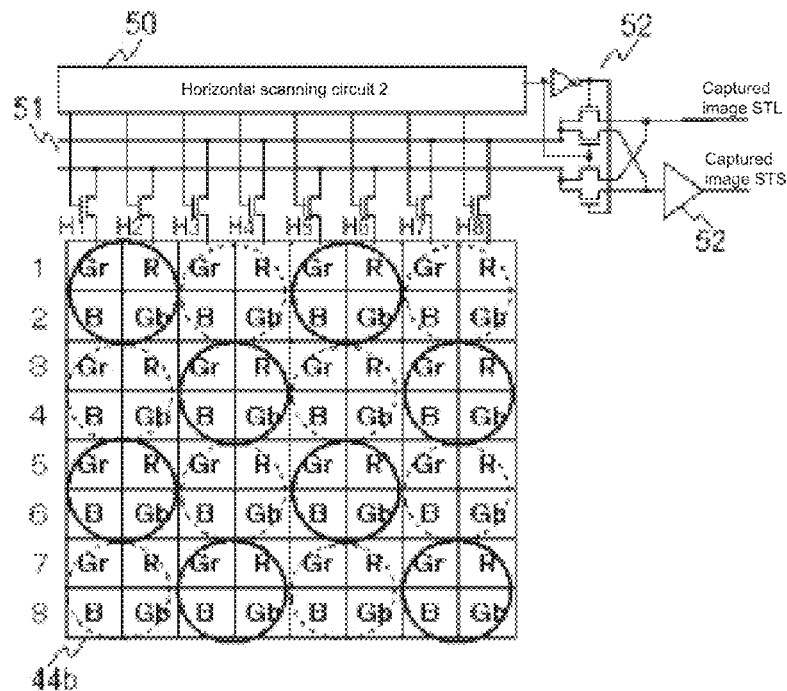
FIG. 22 A configuration diagram schematically showing Example 7 of the pixel combining read operation by a pixel section of FIG. 21.

The motion detection read operation of Embodiment 7 will be described by using the pixel arrangement of FIG. 22 and a horizontal read circuit for a motion detection signal. The operation timing is the same as FIG. 14(B).

First, the read operation for the first line and the second line and the fifth line and the sixth line in the horizontal direction is performed by the horizontal scanning circuit 2 (50) successively for one set to another, each set including eight horizontal pixels. By turning ON the switches H1 to H8 of the horizontal combination circuit 51, short-accumulated signals for four horizontal pixels are averaged and read out to the upper horizontal read line. Together with a signal obtained by combining (adding or averaging) four vertical pixels, there is generated a signal obtained by averaging 16 pixels.

Long-accumulated signals for four horizontal pixels are averaged and read out to the lower horizontal read line of the horizontal combination circuit 51. Together with a signal obtained by combining (adding or averaging) four vertical pixels, there is generated a signal obtained by averaging 16 pixels. Then, the upper/lower side is switched by a signal switching circuit 52, and the image STL signal and the captured image signal STS, which has been amplified through the amplifier circuit 52 by an amount according to the accumulation time ratio, are output to subsequent processes.

The next read operation for the third line and the fourth line and the seventh line and the eighth line is performed by the horizontal scanning circuit 2 (50) successively for one set to another, each set including eight horizontal pixels of the horizontal combination circuit 51. By turning ON the switches H1 to H8, long-accumulated signals for four horizontal pixels are averaged and read out to the upper horizontal read line. Together with a signal obtained by combining (adding or averaging) four vertical pixels, there is generated a signal obtained by combining (adding or averaging) 16 pixels.

Short-accumulated signals for four horizontal pixels are combined together (added or averaged) and read out to the lower horizontal read line of the horizontal combination circuit 51. Together with a signal obtained by combining (adding or averaging) four vertical pixels, there is generated a signal obtained by averaging 16 pixels. Then, without switching the upper/lower side by the signal switching circuit 52, the image STL signal and the captured image signal STS, which has been amplified through the amplifier circuit 52 by an amount according to the accumulation time ratio, are output to subsequent processes.

In Embodiment 7, it is possible to significantly reduce the power consumption during the motion detection operation by adding simple circuits such as the analog amplifier circuit 52, an analog differential signal generation circuit 53 and the analog comparator circuit 55, without using a CDS circuit, an ADC circuit, a line memory, etc.

Features of the various embodiments described above can be combined with one another. Although the cell structure of the pixel section of the image-capturing device is a 2-pixel-1-cell structure including one output circuit for two photodiodes in the above description, the cell structure is not limited to the 2-pixel-1-cell structure, but may use other structures such as 1-pixel-1-cell and 4-pixel-1-cell. Although the typical Bayer arrangement was used in the description above as a color filter arrangement, the arrangement is not limited to the Bayer arrangement as long as it is possible to make use of the characteristics of the present invention.

REFERENCE SIGNS LIST 10a, 10b, 10c Motion detection image processing device
30a, 30b Video management device
11 Image-capturing lens
12 Image-capturing device
13 Differential signal generation circuit
14 Motion determination circuit
15 Motion determination signal output circuit
16 Video signal output circuit
17 Date/time generation circuit 18 Time addition circuit
19 Motion determination threshold setting circuit
20 Frame memory
21 Color signal processing circuit
22 Motion determination signal input circuit
23 Video signal input circuit
24 Video signal recording server
25 LAN output device
26 Web output device
27 Video monitor
28 Motion determination signal addition circuit
29 Motion determination signal extraction circuit
31 Line memory
32 Delay circuit
33, 52 Amplifier circuit
34 Signal addition circuit
35 Captured image signal separation circuit
36 Sensor core
37 Pixel signal combination
38 Code signal generation circuit
39 Captured image signal switching circuit
40 Timing generation circuit
41 Accumulation time control circuit
42 Vertical scanning circuit
43 Vertical parallel control circuit
44 Pixel section
45, 51 Horizontal combination circuit
46 CDS circuit
47 ADC circuit
48 Line memory
49, 50 Horizontal scanning circuit
52 Signal line switching circuit
54 Operating time control circuit (timer)
55 Comparison circuit
60 Horizontal read circuit

The invention claimed is:

1. An image-capturing device comprising:
a pixel area including pixel sections having photoelectric conversion elements arranged two-dimensionally on a semiconductor substrate;
a plurality of vertical signal lines arranged with one another in a horizontal direction for outputting pixel signals obtained by photoelectric conversion through the pixel sections from a vertical end portion of the pixel area;
a read unit for simultaneously reading out pixel signals from the plurality of vertical signal lines;
a pixel control unit for controlling the pixel sections; and
a signal processing unit for processing the pixel signals read out from the read unit,
wherein the pixel control unit includes accumulation time control means for dividing the photoelectric conversion elements arranged two-dimensionally into at least two sections, and controlling an accumulation time so that the accumulation time is different therebetween;
the signal processing unit includes differential signal generation means for generating a differential signal between pixel signals each having a different accumulation time, and motion determination means for determining presence/absence of a moving object based on the differential signal generated by the differential signal generation means, and motion determination signal output means for outputting a motion determination signal obtained by the determination by the motion determination means; and
wherein when there is a moving object, the motion determination means sets the motion determination signal to HI level;
when there is no motion, the motion determination means sets the motion determination signal to LO level.

2. The image-capturing device of claim 1,
wherein at least part of a circuit of a video management device provided outside the image-capturing device for managing a video signal of the image-capturing device is stopped based on the motion determination signal output from the motion determination signal output means.

3. The image-capturing device of claim 1, further comprising:
video signal processing means for processing the pixel signals output from the read unit for simultaneously reading out the pixel signals from the vertical signal lines into a video signal to be reproduced on a monitor; and
a circuit stopping means for stopping at least part of a circuit of the video signal processing means or the pixel control unit based on the motion determination signal obtained by the determination by the motion determination means.

4. The image-capturing device of claim 1, further comprising pixel signal combination means for combining pixel signals of the same accumulation time.

5. The image-capturing device of claim 4, the pixel signal combination means comprises, as vertical pixel signal combination means, vertical parallel control means for simultaneously driving pixel drive lines of a plurality of pixels arranged in a vertical direction.

6. The image-capturing device of claim 4, wherein
the pixel signal combination means includes the read unit; and
the read unit includes horizontal combination means for performing a horizontal pixel signal combination operation on pixel signals from the plurality of vertical signal lines output from the vertical end portion of the pixel area.

7. The image-capturing device of claim 4, wherein the pixel signal combination means combines together a vertical-horizontal two-dimensional array of pixel signals by using a line memory.

8. A motion detection camera comprising:
a pixel area including a plurality of pixel sections having photoelectric conversion elements arranged two-dimensionally for converting a light signal of an image formed by an image-capturing lens into an electrical signal;
differential signal generation means for generating a differential signal between at least two kinds of pixel signals each obtained for a different image-capturing time by the pixel section;
motion determination means for determining presence/absence of a moving object based on the differential signal generated by the differential signal generation means; and
motion determination signal output means for outputting a motion determination signal obtained by the determination by the motion determination means,
wherein when there is a moving object, the motion determination means sets the motion determination signal to HI level; and
when there is no motion, the motion determination means sets the motion determination signal to LO level.

9. The motion detection camera of claim 8, further comprising circuit stopping means and video signal output means,
wherein the circuit stopping means stops an output of video signals from the motion detection camera.

10. The motion detection camera of claim 8, further comprising pixel signal combination means for combining together pixel signals of the same image-capturing time.

11. The motion detection camera of claim 10, wherein the pixel signal combination means combines together a vertical-horizontal two-dimensional array of pixel signals by using a line memory.

12. A motion detection system comprising:
a pixel area including a plurality of pixel sections having photoelectric conversion elements arranged two-dimensionally for converting a light signal of an image formed by an image-capturing lens into an electrical signal;
differential signal generation means for generating a differential signal between at least two kinds of pixel signals each obtained for a different image-capturing time by the pixel section;
motion determination means for determining presence/absence of a moving object based on the differential signal generated by the differential signal generation means;
motion determination signal output means for outputting a motion determination signal obtained by the determination by the motion determination means; and
a video management device comprising at least one of:
video signal transmission means for transmitting a video signal output from the motion detection camera to be reproduced on a monitor;
video signal recording means for recording the video signal; and
video signal reproduction means for reproducing the video signal on the monitor,
wherein when there is a moving object, the motion determination means sets the motion determination signal to HI level; and
when there is no motion, the motion determination means sets the motion determination signal to LO level.

13. The motion detection system of claim 12, wherein
the motion detection camera further comprises circuit stopping means and video signal output means; and
the circuit stopping means stops an output of video signals from the motion detection camera.

14. The motion detection system of claim 12, wherein the motion detection camera further comprises pixel signal combination means for combining together pixel signals of the same image-capturing time.

15. The motion detection system of claim 12, comprising:
circuit stopping means for stopping at least part of a circuit of the video management device based on the motion determination signal output from the motion determination signal output means.

* * * * *